United States Patent
Keller et al.

(10) Patent No.: US 10,678,335 B2
(45) Date of Patent: Jun. 9, 2020

(54) METHODS, DEVICES, AND SYSTEMS FOR CREATING HAPTIC STIMULATIONS AND TRACKING MOTION OF A USER

(71) Applicants: FACEBOOK TECHNOLOGIES, LLC, Menlo Park, CA (US); The Regents of the University of California, Oakland, CA (US)

(72) Inventors: Sean Jason Keller, Bellevue, WA (US); Tristan Thomas Trutna, Seattle, WA (US); Hrvoje Benko, Seattle, WA (US); Raymond King, Woodinville, WA (US); Yang Lou, Bellevue, WA (US); Yon Visell, Santa Barbara, CA (US); Yitian Shao, Goleta, CA (US); Bharat Dandu, Goleta, CA (US)

(73) Assignee: Facebook Technologies, LLC, Menlo Park, CA (US)

(*) Notice: Subject to any disclaimer, the term of this patent is extended or adjusted under 35 U.S.C. 154(b) by 0 days.

(21) Appl. No.: 16/241,871

(22) Filed: Jan. 7, 2019

(65) Prior Publication Data
US 2019/0212821 A1    Jul. 11, 2019

Related U.S. Application Data

(60) Provisional application No. 62/647,559, filed on Mar. 23, 2018, provisional application No. 62/647,560,
(Continued)

(51) Int. Cl.
*G06F 3/01* (2006.01)
*G06F 1/16* (2006.01)
(Continued)

(52) U.S. Cl.
CPC .............. *G06F 3/016* (2013.01); *G06F 1/163* (2013.01); *G06F 3/011* (2013.01); *G06F 3/014* (2013.01);
(Continued)

(58) Field of Classification Search
CPC .......... G06F 3/016; G06F 3/011; G06F 3/014; G06F 3/015; G06F 3/017; G06F 1/163; G06K 19/07762; G06T 19/006
See application file for complete search history.

(56) References Cited

U.S. PATENT DOCUMENTS 9,797,691 B1    10/2017 Hunn et al.
2014/0125571 A1   5/2014 Um et al.
(Continued)

FOREIGN PATENT DOCUMENTS

| WO | WO2015-102464 A1 | 7/2015 |
| WO | WO2015-127116 A1 | 8/2015 |
| WO | WO2015-199898 A1 | 12/2015 |

OTHER PUBLICATIONS

Da-Chen Pang et al., A Transparent Capacitive Micromachined Ultrasonic Transducer (CMUT) Array for Finger Hover-Sensing Dial Pads, 2017 19th International Conference on Solid-State Sensors, Actuators and Microsystems (Transducers), Kaohsiung, Taiwan: IEEE, Jun. 18-22, 2017, pp. 2171-2174, 4 pgs.
(Continued)

*Primary Examiner* — Peter D McLoone
(74) *Attorney, Agent, or Firm* — Morgan, Lewis & Bockius LLP

(57) ABSTRACT

A method of creating haptic stimulations and anatomical information includes a wearable device including a plurality of transducers that can each generate one or more waves. The method includes activating one or more first transducers of the plurality of transducers based on an instruction
(Continued)

received from a remote device. Waves generated by the activated one or more first transducers provide a haptic stimulation. The method further includes activating one or more second transducers of the plurality of transducers. Waves generated by the activated one or more second transducers provide anatomical information of a user of the wearable device when the waves are received by one or more transducers of the plurality of transducers.

20 Claims, 19 Drawing Sheets

Related U.S. Application Data filed on Mar. 23, 2018, provisional application No. 62/636,699, filed on Feb. 28, 2018, provisional application No. 62/614,790, filed on Jan. 8, 2018.

(51) Int. Cl.
*G06K 19/077* (2006.01)
*G06T 19/00* (2011.01)

(52) U.S. Cl.
CPC .............. *G06F 3/015* (2013.01); *G06F 3/017* (2013.01); *G06K 19/07762* (2013.01); *G06T 19/006* (2013.01)

(56) References Cited

U.S. PATENT DOCUMENTS

| | | |
|---|---|---|
| 2016/0019762 A1 | 1/2016 | Levesque et al. |
| 2016/0100034 A1 | 4/2016 | Miller |
| 2016/0357261 A1 | 12/2016 | Bristol et al. |
| 2017/0097753 A1 | 4/2017 | Bailey et al. |
| 2017/0102771 A1* | 4/2017 | Lei .................. G06F 3/0436 |
| 2017/0115733 A1 | 4/2017 | Du |
| 2017/0123487 A1* | 5/2017 | Hazra ............... G06F 3/015 |
| 2017/0220005 A1 | 8/2017 | Han et al. |

OTHER PUBLICATIONS

FaceBook Technologies, LLC, International Search Report and Written Opinion, PCT/US2019/012697, dated Apr. 29, 2019, 10 pgs.
FaceBook Technologies, LLC, International Search Report and Written Opinion, PCT/US2019/012702, dated Apr. 29, 2019, 11 pgs.
FaceBook Technologies, LLC, International Search Report and Written Opinion, PCT/US2019/012718, dated May 3, 2019, 10 pgs.
FaceBook Technologies, LLC, International Search Report and Written Opinion, PCT/US2019/012721, dated Apr. 29, 2019, 10 pgs.
Zhang, "SkinTrack: Using the Body as an Electrical Waveguide for Continuous Finger Tracking on the Skin," © 2016 ACM, ISBN978-1-4503-3362-7/16/05, 13 pgs.

* cited by examiner

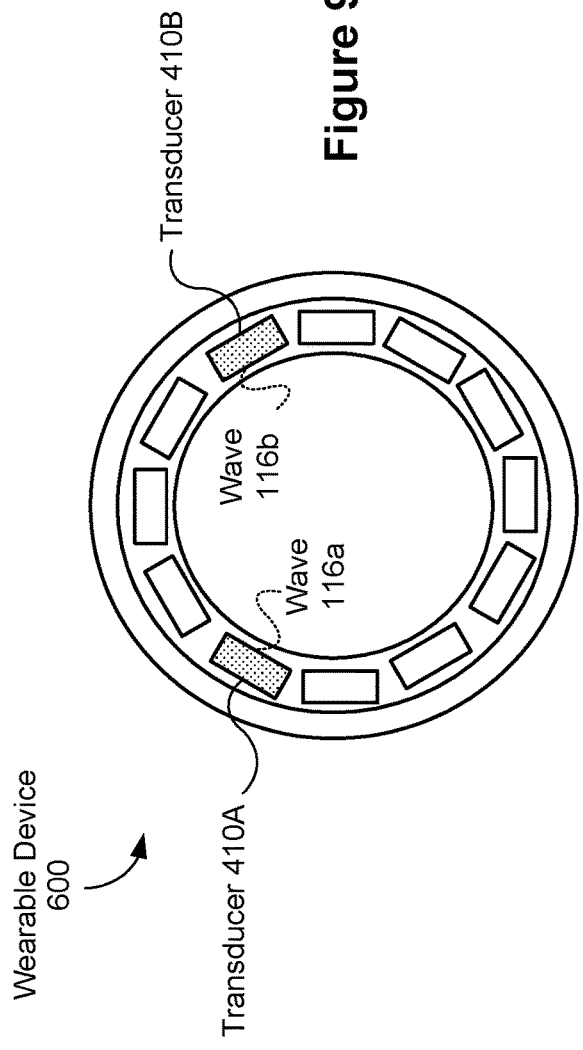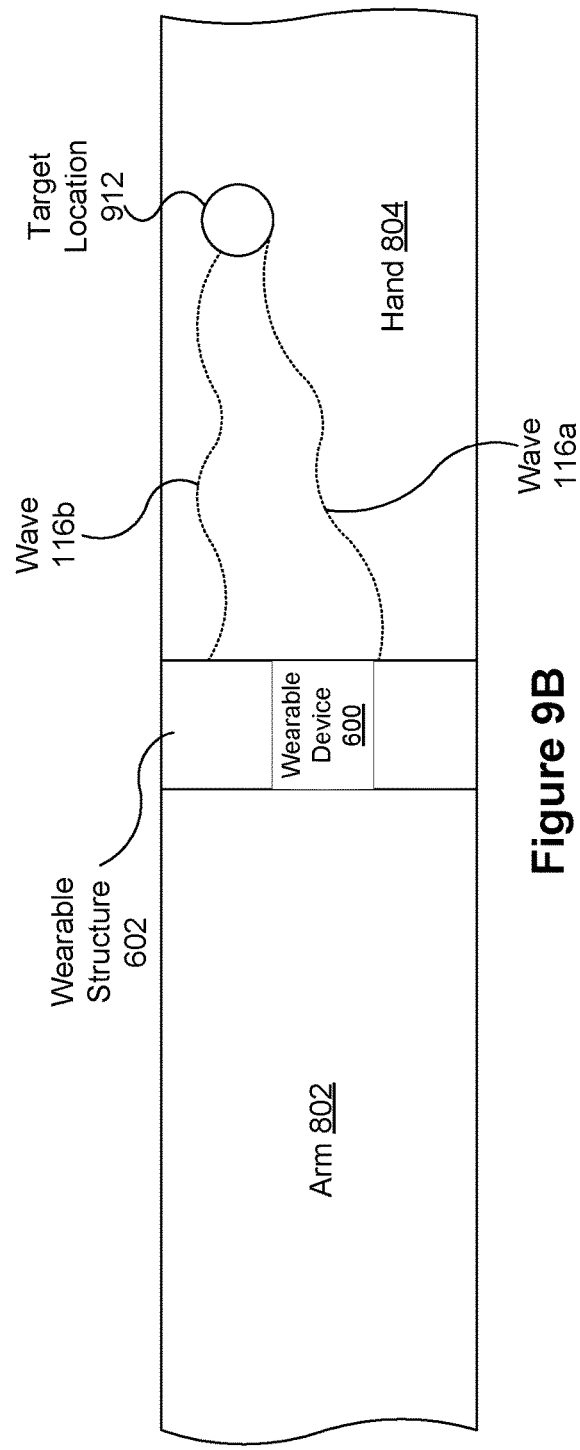

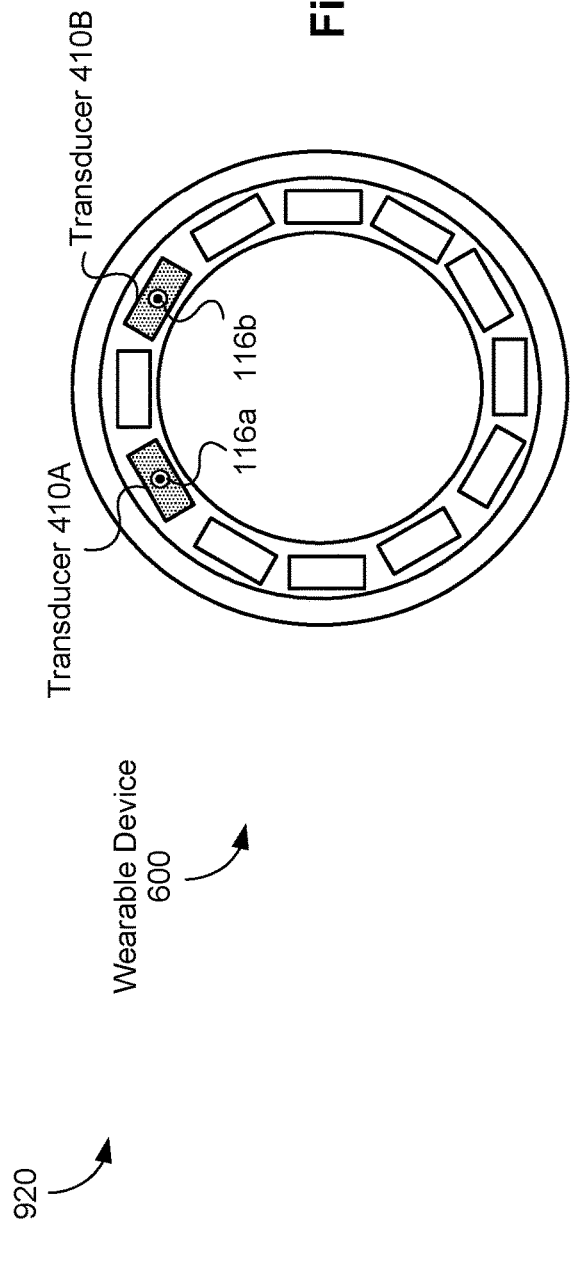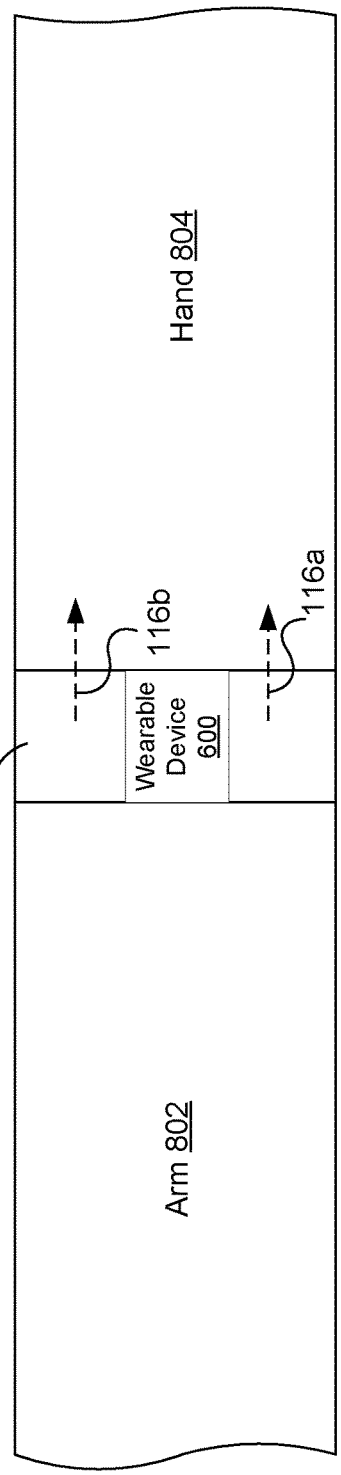

1000

At a wearable device comprising a plurality of transducers that can each generate one or more waves 1002

Activate one or more first transducers of the plurality of transducers based on an instruction received from a remote device. Waves generated by the activated one or more first transducers provide a haptic stimulation 1004

Activate one or more second transducers of the plurality of transducers. Waves generated by the activated one or more second transducers provide tomographic information of a user of the wearable device when the waves are received by one or more transducers of the plurality of transducers 1006

Figure 10

METHODS, DEVICES, AND SYSTEMS FOR CREATING HAPTIC STIMULATIONS AND TRACKING MOTION OF A USER

CROSS REFERENCE TO RELATED APPLICATIONS

This application claims priority to U.S. Provisional Application No. 62/636,699, filed Feb. 28, 2018, entitled "Methods, Devices, and Systems for Creating Haptic Stimulations and Tracking Motion of a User;" U.S. Provisional Application No. 62/647,559, filed Mar. 23, 2018, entitled "Methods, Devices, and Systems for Determining Contact On a User of a Virtual Reality and/or Augmented Reality Device;" U.S. Provisional Application No. 62/647,560, filed Mar. 23, 2018, entitled "Methods, Devices, and Systems for Projecting an Image Onto a User and Detecting Touch Gestures;" and U.S. Provisional Application No. 62/614,790, filed Jan. 8, 2018, entitled "Methods, Devices, and Systems for Creating Localized Haptic Sensations on a User," each of which is incorporated by reference herein in its entirety.

This application is related to U.S. Utility patent application Ser. No. 16/241,890 entitled "Methods, Devices, and Systems for Determining Contact On a User of a Virtual Reality and/or Augmented Reality Device," filed Jan. 7, 2019, U.S. Utility patent application Ser. No. 16/241,893, entitled "Methods, Devices, and Systems for Displaying a User Interface on a User and Detecting Touch Gestures," filed Jan. 7, 2019, and U.S. Utility patent application Ser. No. 16/241,900, entitled "Methods, Devices, and Systems for Creating Localized Haptic Sensations on a User," filed Jan. 7, 2019, each of which is incorporated by reference herein in its entirety.

TECHNICAL FIELD

This relates generally to haptic stimulation and tracking motion, including but not limited to creating haptic stimulations on a user of a virtual and/or augmented reality devices and tracking motion of the user.

BACKGROUND

Virtual and augmented reality devices have wide applications in various fields, including engineering design, medical surgery practice, military simulated practice, video gaming, etc. Haptic or kinesthetic stimulations recreate the sense of touch by applying forces, vibrations, and/or motions to a user, and are frequently implemented with virtual and augmented reality devices. In certain applications, haptic stimulations are desired at locations where dexterity and motion of the user cannot be constrained. Conventional haptic creating devices (e.g., a glove or handheld device), however, are not well suited for these applications.

Additionally, in order for virtual reality and augmented reality devices to function properly, a position of a user's extremities (e.g., arm, hand, etc.) generally needs to be known. In the past, cameras were used to determine the position of the user's extremities. Cameras, however, cannot adequately capture the intricacies of certain extremities, such as the human hand, especially when a full image of the human hand cannot be captured. As a result, challenges still exist with determining a position/pose of certain extremities (e.g., a pose of the user hand).

SUMMARY

Accordingly, there is a need for methods, devices, and systems that can (i) create haptic stimulations on a user without constraining dexterity and motion of the user and (ii) aid in determining a position of the user's extremities. One solution is a wearable device that does not encumber the user but is still able to create adequate haptic stimulations. The wearable device can also generate anatomical information (e.g., tomographic information) of a user of the wearable device, and facilitate creation of a partial representation of the user (e.g., a representation of the user's hand) from the anatomical information.

In some embodiments, the solution explained above can be implemented on a wearable device that includes a plurality of transducers (e.g., actuators). The wearable device in some instances is worn on the user's body (e.g., wrist, ankle, etc.) and can be used to stimulate areas of the body. Moreover, the wearable device can be in communication with a remote device (e.g., a virtual reality device and/or an augmented reality device, among others), and the wearable device can stimulate the body based on an instruction from the remote device.

As an example, the remote device may display media content (e.g., video data) or provide concomitant audio signals to a user (e.g., via a head-mounted display), and the remote device may also instruct the wearable device to create haptic stimulations that correspond to the media content. Additionally, the wearable device may collect anatomical information of the user and may relay the anatomical information to the remote device. In turn, the remote device may use the anatomical information to create a partial representation of the user (e.g., a representation of the user's hand) and may also incorporate the partial representation into the visual data. By using the anatomical information, the remote device is able to create a more accurate representation of the user's hand. The media content or the concomitant audio signals displayed by the host system could be used to modify the perceptual or cognitive interpretation of the stimulation (i.e. by displacing the perceived location of the stimulation towards a seen contact with an object, or by modifying the perceived pattern of vibration to be closer to the produced sound).

Thus, the devices, systems, and methods described herein provide benefits including but not limited to: (i) stimulating areas of the body that correspond to displayed visual data, (ii) creating anatomical information that improves the displayed visual data or other data gathered by sensors (e.g., sensors on the wearable device), (iii) the wearable device does not encumber free motion of a user's hand and/or wrist (or other body parts), and (iv) multiple wearable devices can be used simultaneously.

(A1) In accordance with some embodiments, a method is performed at a wearable device that includes a plurality of transducers that can each generate one or more waves (also referred to as "signals"). The method includes activating one or more first transducers of the plurality of transducers based on an instruction received from a remote device. Waves generated by the activated one or more first transducers provide a haptic stimulation. The method further includes activating one or more second transducers of the plurality of transducers. Waves generated by the activated one or more second transducers provide anatomical information of a user of the wearable device when the waves are received by one or more transducers of the plurality of transducers. In some embodiments, the anatomical information is tomographic information.

(A2) In some embodiments of the method of A1, the instruction received from the remote device corresponds to visual data displayed by a head-mounted display in communication with the remote device.

(A3) In some embodiments of the method of any of A1-A2, the wearable device also includes a radio, and the method further includes receiving, by the radio, the instruction from the remote device.

(A4) In some embodiments of the method of any of A1-A3, further including sending, by the radio, the anatomical information to the remote device after activating the one or more second transducers.

(A5) In some embodiments of the method of A4, the anatomical information, when received by the remote device, causes the remote device to: (i) generate at least a partial representation of the user of the wearable device from the anatomical information; and (ii) include the representation in the visual data displayed by the head-mounted display.

(A6) In some embodiments of the method of any of A1-A5, the anatomical information corresponds to a user's hand posture at a particular point in time.

(A7) In some embodiments of the method of any of A1-A6, the waves generated by the one or more first transducers are generated at a first frequency within a first frequency range, the waves generated by the one or more second transducers are generated at a second frequency within a second frequency range, and the second frequency range is different from the first frequency range.

(A8) In some embodiments of the method of any of A1-A7, the wearable device also includes a band configured to be secured around a wrist or ankle of the user, and each of the plurality of transducers is coupled to the band.

(A9) In some embodiments of the method of A8, transducers of the plurality of transducers are radially spaced along a perimeter of the band.

(A10) In some embodiments of the method of any of A8-A9, the one or more transducers of the plurality of transducers that receive the waves are opposite the one or more second transducers on the band.

(A11) In some embodiments of the method of any of A1-A10, transducers of the plurality of transducers are spaced equidistant from one another on the wearable device.

(A12) In some embodiments of the method of any of A1-A11, transducers in the plurality of transducers are arranged in columns on the wearable device, and transducers in a first respective column are adjacent to and parallel with corresponding transducers in a second respective column.

(A13) In some embodiments of the method of any of A1-A12, the waves generated by the plurality of transducers are ultrasonic waves.

(A14) In some embodiments of the method of any of A1-A13, activating the one or more first transducers and activating one or more second transducers comprises activating the one or more first transducers and the one or more second transducers simultaneously.

(A15) In some embodiments of the method of any of A1-A14, the one or more first transducers are activated at a first time and the one or more second transducers are activated a second time different from the first time.

(A16) In some embodiments of the method of any of A1-A15, the one or more transducers that receive the waves generated by the activated one or more second transducers include one or more transducers from (i) the one or more second transducers and/or (ii) the one or more first transducers.

(A17) In some embodiments of the method of any of A1-A16, the one or more first transducers include: (i) a first group of transducers that generates waves in a first direction, and (ii) a second group of transducers that generates waves in a second direction different from the first direction.

(A18) In some embodiments of the method of any of A1-A17, the one or more first transducers and the one or more second transducers are the same transducers.

In accordance with some embodiments, a wearable device includes one or more processors/cores and memory storing one or more programs configured to be executed by the one or more processors/cores. The one or more programs include instructions for performing the operations of the method described above (A1-A18). In accordance with some embodiments, a non-transitory computer-readable storage medium has stored therein instructions that, when executed by one or more processors/cores of a wearable device, cause the wearable device to perform the operations of the method described above (A1-A18). In accordance with some embodiments, a system includes a wearable device, a head-mounted display (HMD), and a computer system to provide video/audio feed to the HMD and instructions to the wearable device.

In another aspect, a wearable device is provided and the wearable device includes means for performing any of the methods described herein (A1-A18).

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures and specification.

FIGS. 9A and 9B are a different views of the wearable device of FIG. 6A generating waves to create localized haptics stimulations in accordance with some embodiments.

FIGS. 9C-9E are different views of the wearable device of FIG. 6A generating waves to create haptics stimulations in accordance with some embodiments.

FIG. 10 is a flow diagram illustrating a method of generating haptic stimulations and topographic information in accordance with some embodiments.

DESCRIPTION OF EMBODIMENTS

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

As used herein, the term "exemplary" is used in the sense of "serving as an example, instance, or illustration" and not in the sense of "representing the best of its kind."

Figure 1:
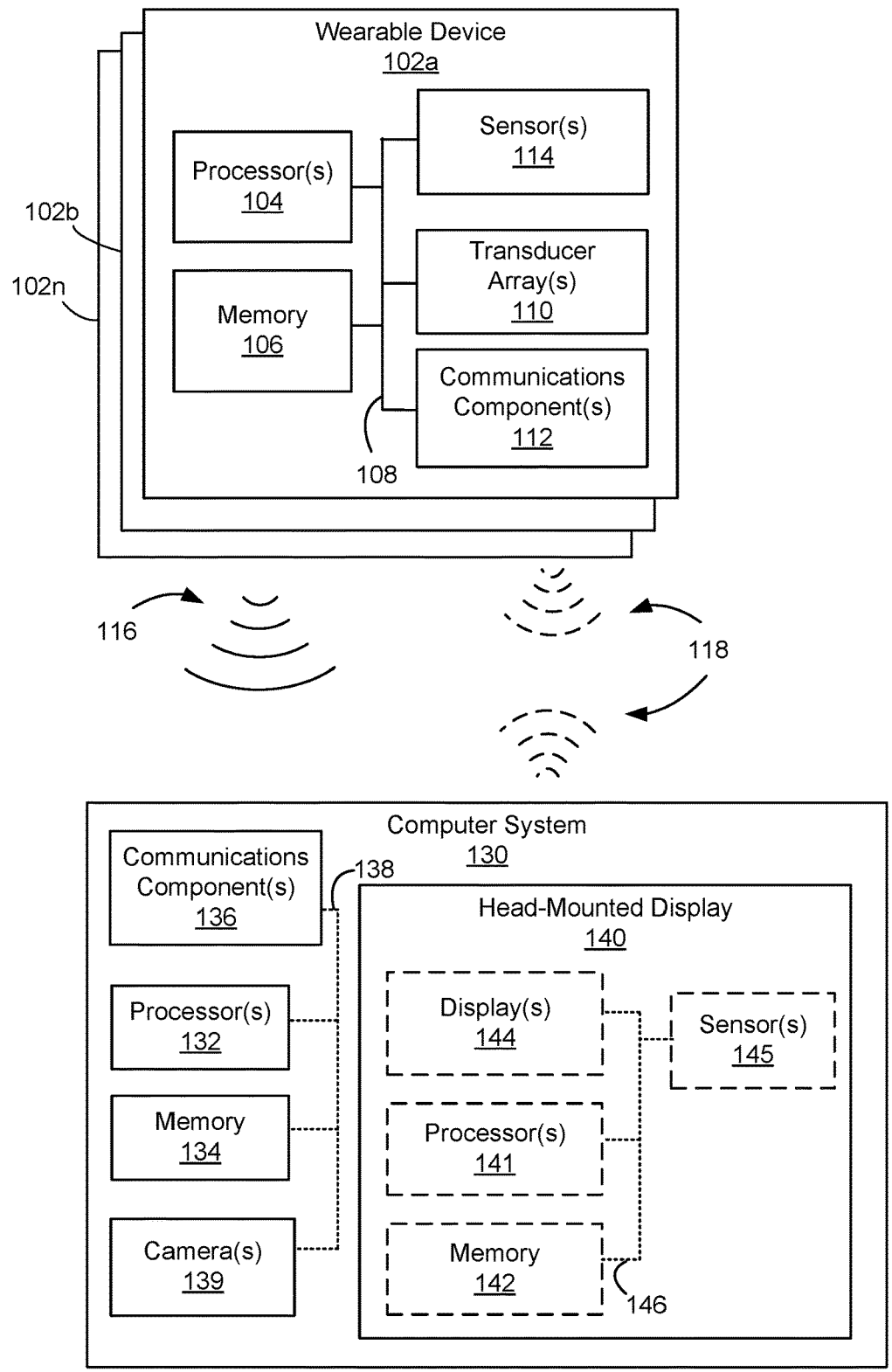
FIG. 1 is a block diagram illustrating an exemplary haptics system, in accordance with various embodiments.

FIG. 1 is a block diagram illustrating a system 100, in accordance with various embodiments. While some example features are illustrated, various other features have not been illustrated for the sake of brevity and so as not to obscure pertinent aspects of the example embodiments disclosed herein. To that end, as a non-limiting example, the system 100 includes a wearable device 102, which is used in conjunction with a computer system 130 (e.g., a host system or a host computer). In some embodiments, the system 100 provides the functionality of a virtual reality device with haptics feedback, an augmented reality device with haptics feedback, a combination thereof, or provides some other functionality. The system 100 is described in greater detail below with reference FIGS. 13-15.

An exemplary wearable device 102 (e.g., wearable device 102a) includes, for example, one or more processors/cores 104, memory 106, one or more transducer arrays 110, one or more communications components 112 (also referred to herein as "radios"), and/or one or more sensors 114. In some embodiments, these components are interconnected by way of a communications bus 108. References to these components of the wearable device 102 cover embodiments in which one or more of these components (and combinations thereof) are included. In some embodiments, the one or more sensors 114 are part of the one or more transducer (e.g., transducers also perform the functions of the one or more sensors 114, discussed in further detail below). For example, one or more transducers in the transducer array 110 may be electroacoustic transducers configured to detect acoustic waves (e.g., ultrasonic waves).

In some embodiments, each wearable device 102 includes one or more processors 104 that execute software modules for controlling operation of the wearable device 102. In some embodiments, a single wearable device 102 (e.g., wearable device 102a) includes multiple processors 104, such as one or more wearable device processors (configured to, e.g., control transmission of waves 116 by the transducer(s) 110), one or more communications component processors (configured to, e.g., control communications transmitted by communications component 112 and/or receive communications by way of communications component 112) and/or one or more sensor processors (configured to, e.g., control operation of sensor 114 and/or receive output from sensor 114).

The wearable device 102 is configured to generate (and receive) waves 116 (signals), via the one or more transducers in a respective transducer array 110 (or a subset of the one or more transducers), that create one or more haptic stimulations felt by a user of the wearable device (i.e., at and near the immediate area of contact of the wearable device). In some embodiments, the wearable device 102 is also configured to generate waves 116 that provide anatomical information of a user of the wearable device 102 (e.g., when the waves are received by one or more transducers of the plurality of transducers). For example, if the wearable device is attached to the user's right wrist, then the anatomical information is of the right wrist. Further, the anatomical information can be used to determine a posture/pose of the user of the wearable device 102. For example, the anatomical information for the user's right wrist can be used to determine a pose of the user's right hand. In some instances, the determined posture/pose can be further used to identity a gesture being made by the user. For example, the determined posture/pose may indicate that the user is making a pinch gesture with his right hand. In another example, the determined posture/pose may indicate that the user is pressing on a surface with one finger (or multiple fingers). In yet another example, the determined posture/pose may indicate that the user is making a full-hand swipe gesture or a finger swipe gesture. Various other gestures could also be detected and used to manipulate what is displayed by the head-mounted display.

In some embodiments, the one or more transducers are miniature piezoelectric actuators/devices, vibrotactile actuators, single or multipole voice coil motors, or the like. In some embodiments, the one or more transducers form one or more transducer arrays. In some embodiments, the waves 116 generated by the one or more transducers are mechanical waves (e.g., sound waves, ultrasonic waves, or various other mechanical waves). A mechanical wave is an oscillation of matter, which transfers energy through a medium. The "medium" may be air or the wearer's body. In some instances, oscillations or vibrations of the medium are similar to ripples created when an object impacts a body of water.

The computer system 130 is a computing device that executes virtual reality applications and/or augmented reality applications to process input data from the sensors 145 on the head-mounted display 140 and the sensors 114 on the wearable device 102. The computer system 130 provides output data for (i) the electronic display 144 on the head-mounted display 140 and (ii) the wearable device 102 (e.g., processors 104 of the haptic device 102, FIG. 2A). An exemplary computer system 130, for example, includes one or more processor(s)/core(s) 132, memory 134, one or more communications components 136, and/or one or more cameras 139. In some embodiments, these components are interconnected by way of a communications bus 138. References to these components of the computer system 130 cover embodiments in which one or more of these components (and combinations thereof) are included.

The computer system 130 may be any suitable computer device, such as a laptop computer, a tablet device, a netbook, a personal digital assistant, a mobile phone, a smart phone, a virtual reality device (e.g., a virtual reality (VR) device, an augmented reality (AR) device, or the like), a gaming device, a computer server, or any other computing device. The computer system 130 is sometimes called a host, a host system, or a remote device.

Figure 14:
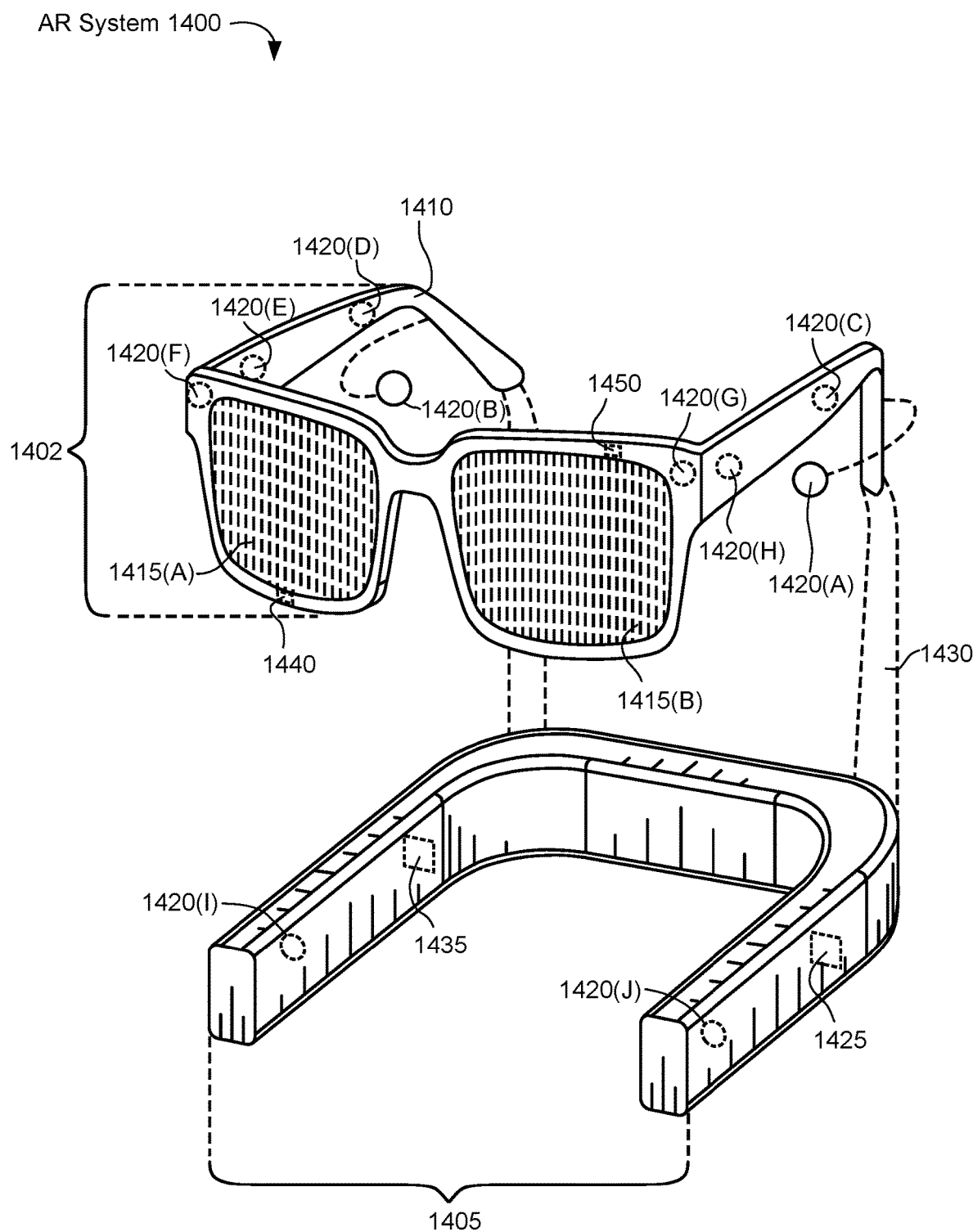
FIG. 14 illustrates an embodiment of an augmented reality headset and a corresponding neckband.
Figure 15:
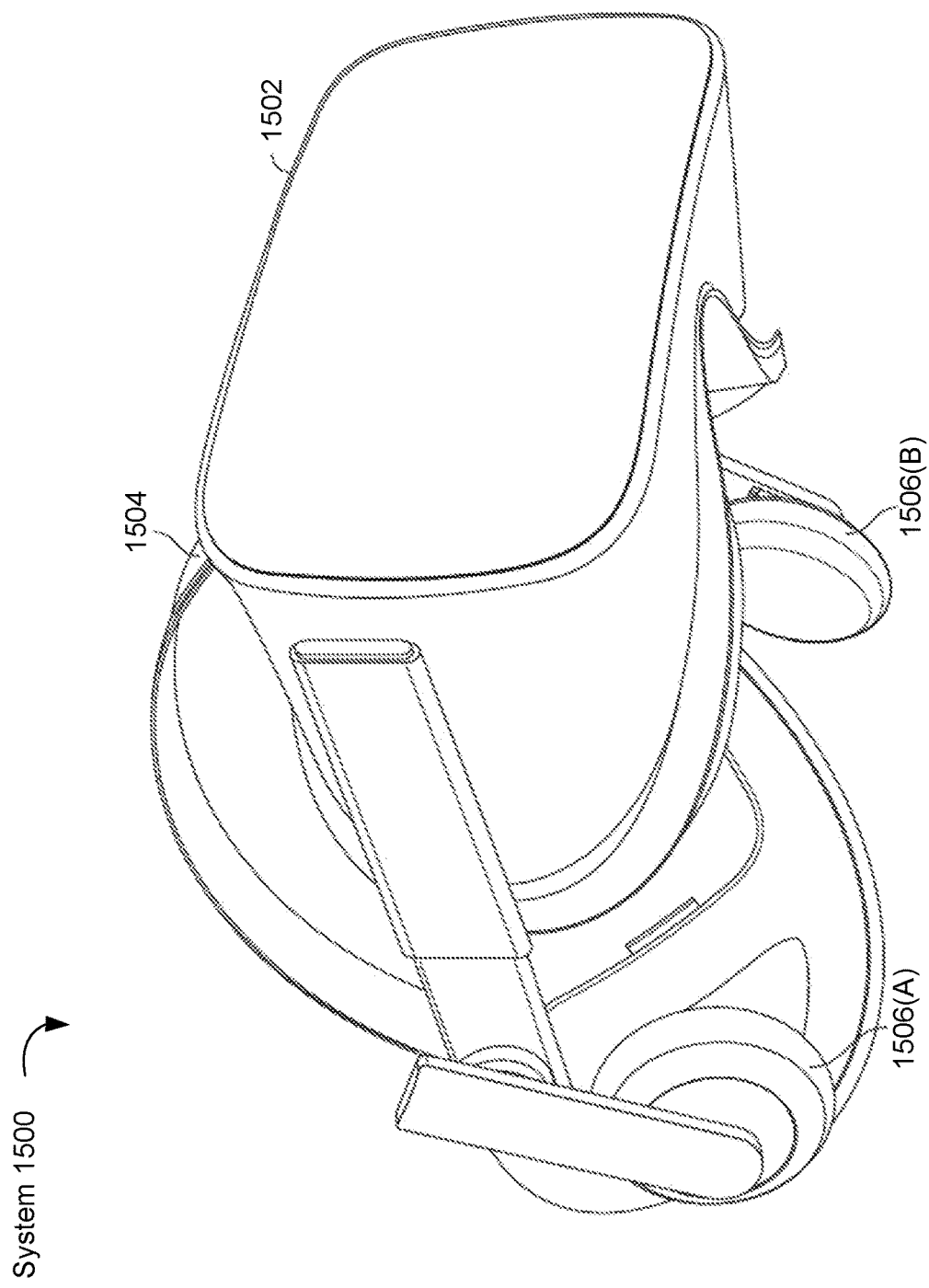
FIG. 15 illustrates an embodiment of a virtual reality headset.

The head-mounted display 140 presents media to a user. Examples of media presented by the head-mounted display 140 include images, video, audio, or some combination thereof. In some embodiments, audio is presented via an external device (e.g., speakers and/or headphones) that receives audio information from the head-mounted display 140, the computer system 130, or both, and presents audio data based on the audio information. The displayed images may be in virtual reality, augment reality, or mixed reality. An exemplary head-mounted display 140, for example, includes one or more processor(s)/core(s) 141, memory 142, and/or one or more displays 144. In some embodiments, these components are interconnected by way of a communications bus 146. References to these components of the head-mounted display 140 cover embodiments in which one or more of these components (and combinations thereof) are included. It is noted that in some embodiments the head-mounted display 140 includes one or more sensors 145. Alternatively, in some embodiments, the one or more sensors 145 are part of the computer system 130. FIGS. 14 and 15 illustrate additional examples (e.g., AR system 1400 and VR system 1500) of the head-mounted display 140.

The electronic display 144 displays images to the user in accordance with data received from the computer system 130. In various embodiments, the electronic display 144 may comprise a single electronic display or multiple electronic displays (e.g., one display for each eye of a user).

The sensors 145 include one or more hardware devices that detect spatial and motion information about the head-mounted display 140. Spatial and motion information can include information about the position, orientation, velocity, rotation, and acceleration of the head-mounted display 140. For example, the sensors 145 may include one or more inertial measurement units (IMUs) that detect rotation of the user's head while the user is wearing the head-mounted display 140. This rotation information can then be used (e.g., by the computer system 130) to adjust the images displayed on the electronic display 144. In some embodiments, each IMU includes one or more gyroscopes, accelerometers, and/or magnetometers to collect the spatial and motion information. In some embodiments, the sensors 145 include one or more cameras positioned on the head-mounted display 140.

In some embodiments, the computer system 130 is a standalone device that is coupled to the head-mounted display 140. For example, the computer system 130 has one or more processors/cores 132 for controlling one or more functions of the computer system 130 and the head-mounted display 140 has one or more processors/cores 141 for controlling one or more functions of the head-mounted display 140. Alternatively, in some embodiments, the head-mounted display 140 is a component of computer system 130. For example, the one or more processors 132 control functions of the computer system 130 and the head-mounted display 140. In addition, in some embodiments, the head-mounted display 140 includes the one or more processors 141 that communicate with the one or more processors 132 of the computer system 130. In some embodiments, communications between the computer system 130 and the head-mounted display 140 occur via a wired connection between communications bus 138 and communications bus 146. In some embodiments, the computer system 130 and the head-mounted display 140 share a single communications bus.

In some embodiments, the one or more cameras 139 of the computer system 130 are used to facilitate virtual reality and/or augmented reality. Moreover, in some embodiments, the one or more cameras 139 act as projectors to display the virtual and/or augmented images (or in some embodiments the computer system includes one or more distinct projectors). In some embodiments, the computer system 130 provides images captured by the one or more cameras 139 to the head-mounted display 140, and the display 144 in turn displays the provided images. In some embodiments, the one or more processors 141 of the head-mounted display 140 process the provided images. In some embodiments, the one or more cameras 139 are part of the head-mounted display 140 (not shown).

Figure 4:
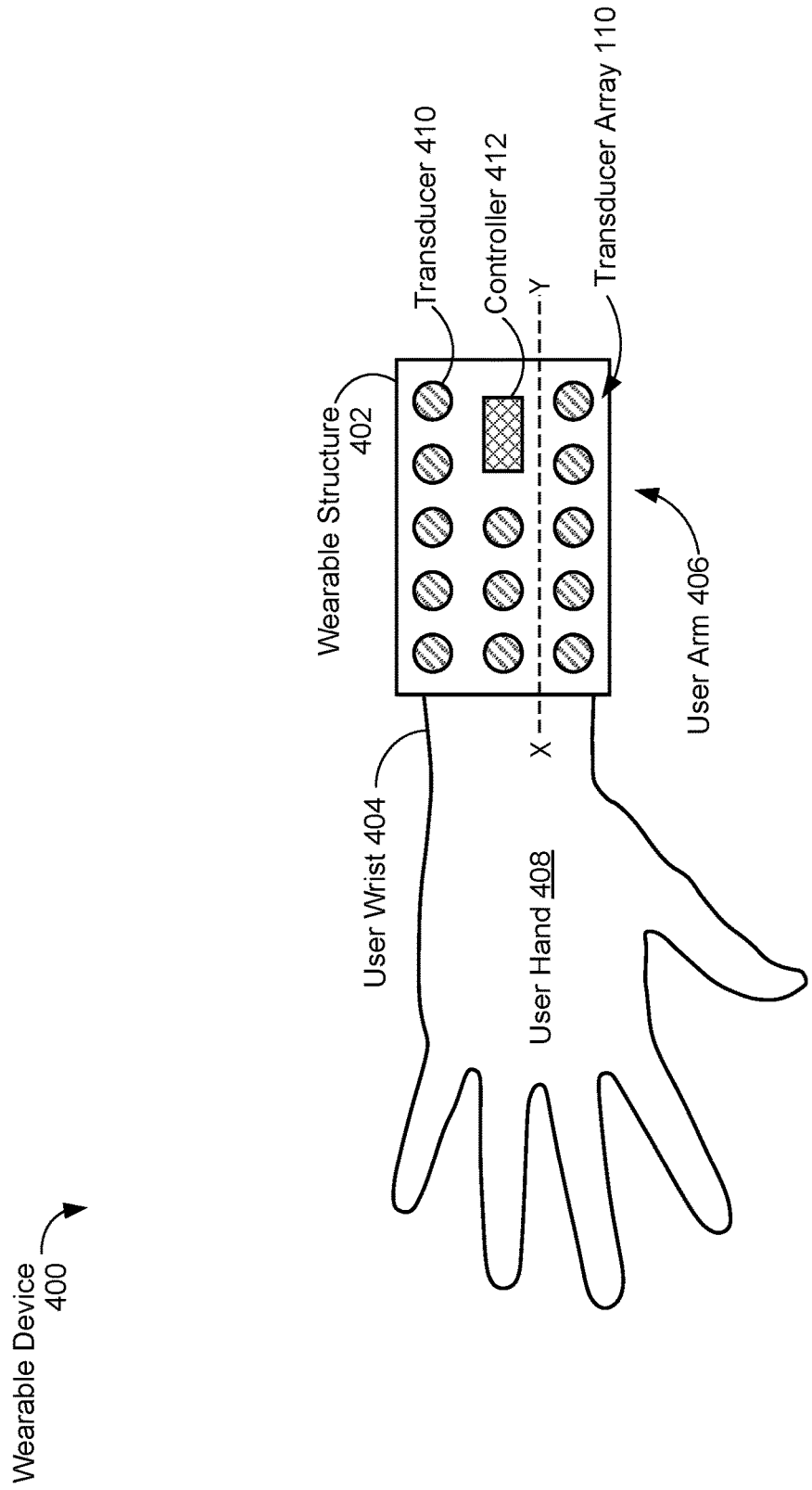
FIG. 4 is an exemplary view of a wearable device on a user's wrist, in accordance with some embodiments.

Integrated circuits (not shown) of the wearable device 102, such as a controller/control circuit and/or waveform generator, may control the behavior of the transducers (e.g., controller 412, FIG. 4). For example, based on the information (e.g., an instruction) received from the computer system 130 by way of a communication signal 118, a controller may select values of waveform characteristics (e.g., amplitude, frequency, trajectory, direction, phase, pulse duration, among other characteristics) used for generating the waves 116 that would provide a sufficient haptic stimulation to be felt by the wearer/user. The controller further selects, at least in some embodiments, different values of the characteristics for the one or more transducers to create various haptic stimulations (e.g., pulsating feedback, impact feedback, rotational feedback, among others). In this way, the controller is able to create various haptic stimulations that mirror the visual data displayed by the head-mounted display 140. The controller may also identify one or more transducers that would be effective in transmitting the waves 116 and may in turn activate the identified transducers. In some embodiments, the one or more processors 104 are a component of the controller and the one or more processors perform one or more of the operations described above.

The communications component 112 includes a communications component antenna for communicating with the computer system 130. Moreover, the communications component 136 includes a complementary communications component antenna that communicates with the communications component 112. The respective communication components are discussed in further detail below with reference to FIGS. 2 and 3.

In some embodiments, data contained within communication signals 118 is used by the wearable device 102 for selecting specific values of characteristics used by the one or more transducers to transmit the waves 116. In some embodiments, the data contained within the communication signals 118 alerts the computer system 130 that the wearable device 102 is ready for use. As will be described in more detail below, the computer system 130 sends instructions to the wearable device 102, and in response to receiving the instruction, the wearable device generates waves 116 that create the haptic stimulation and/or the anatomical information. Although not shown, in some embodiments, the wearable device 102 is connected to the computer system 130 via a cable/wire and the communication between the wearable device 102 and the remote system 130 is through the cable/wire.

Non-limiting examples of sensors 114 and/or sensors 145 include, e.g., infrared, pyroelectric, ultrasonic, laser, optical, Doppler, gyro, accelerometer, resonant LC sensors, capacitive sensors, heart rate sensors, acoustic sensors, and/or inductive sensors. In some embodiments, sensors 114 and/or sensors 145 are configured to gather data that is used to determine a hand posture of a user of the wearable device and/or an impedance of the medium. Examples of sensor data output by these sensors include: body temperature data, infrared range-finder data, motion data, activity recognition data, silhouette detection and recognition data, gesture data, heart rate data, and other wearable device data (e.g., biometric readings and output, accelerometer data). In some embodiments, the one or more transducers serve as sensors.

As will be discussed in greater detail below, the haptic stimulation created by the wearable device 102 can correspond to visual data displayed by the head-mounted display 140. To provide some context, the visual data displayed by the head-mounted display 140 may depict an insect crawling across the wearer's hand. The wearable device 102 may create one or more haptic stimulations to mimic, but not necessarily match, a feeling of the insect crawling across the wearer's hand. As one can imagine, an insect crawling across one's hand is a subtle feeling, and therefore the haptic stimulation created by the wearable device 102 would be equally subtle. Further, as the insect moves across the wearer's hand, so would a location (or locations) of the haptic stimulation. As another example, the visual data displayed by the head-mounted display 140 may depict the user shooting a bow and arrow. The wearable device 102 may create one or more haptic stimulations to mimic a feeling of the arrow releasing from the bow. As one can imagine, releasing an arrow from a bow creates a quick, yet intense feeling in the hands/forearms of the archer, and therefore the haptic stimulation created by the wearable device would be similarly intense. In yet another example, the visual data displayed by the head-mounted display 140 may depict a user in a dark cave, and therefore the user's visual sense in essence cannot be used. In such an example, the wearable device 102 may create one or more haptic stimulations to mimic sensations encountered in a cave, e.g., feeling of water dripping on the user, and/or bats flying past the user's arms, legs, and other body parts depending on the number of wearable devices 102 implemented.

Figure 8:
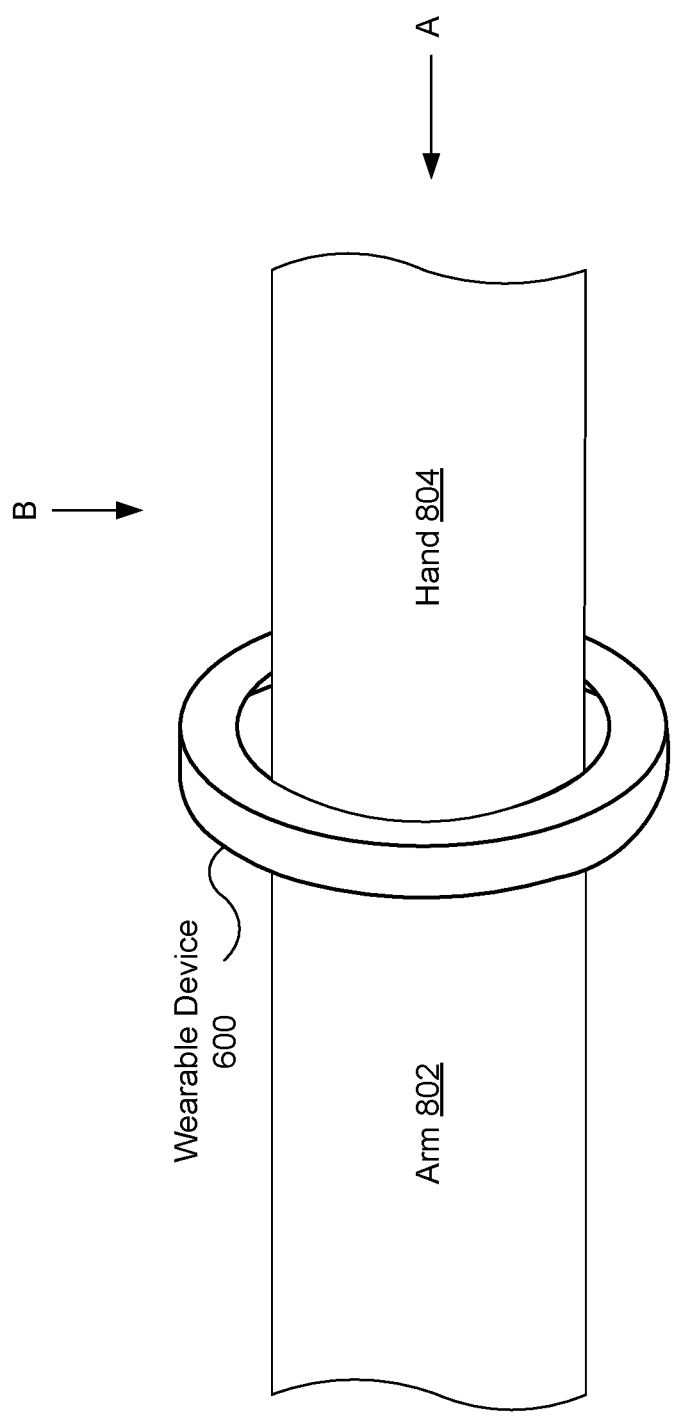
FIG. 8 illustrates the wearable device of FIG. 6A attached to a user's wrist in accordance with some embodiments.

In doing so, the user is further immersed in the virtual and/or augmented reality such that the user not only sees (at least in some instances) the visual data in the head-mounted display 140, but also the user "feels" certain aspects of the displayed visual data. Moreover, the wearable device is designed to not restrict movement of the user's hand. For example, as shown in FIG. 8, the wearable device 600 is attached to a wrist of the user and therefore the user's hand is unencumbered.

It is noted that the haptic stimulation created by the wearable device 102 can correspond to additional data or events (i.e., not limited to visual data displayed by the head-mounted display 140). For example, the haptic stimulation created by the wearable device 102 can correspond to physiological information of the wearer. The physiological information may be gathered by sensors 114 of the wearable device 102 (e.g., IMU, heart rate sensor, etc.) and/or sensors of other devices (e.g., sensors 145 and cameras 139). The haptic stimulation may also correspond to proprioceptive events, such as mechanical stimulations produced by the user (e.g., when the wearer taps on a virtual object). Information for mechanical stimulations can also be gathered by sensors 114 of the wearable device 102 and/or sensors of other devices (e.g., sensors 145 and cameras 139).

Additionally, as will be discussed in greater detail below, the anatomical information gathered by the wearable device 102 can be used by the computer system 130 and/or the head-mounted display 140 to generate the visual data to be displayed by the head-mounted display 140. For example, the anatomical information may be tomographic information, and the tomographic information generated by the wearable device 102 may indicate that the user's hand is in a fist. As a result, the computer system 130 and/or the head-mounted display 140 may update the visual data to reflect the fact that the user's hand is in a fist. This is particularly useful when the user's hand is obstructed such that camera(s) 139 cannot capture the user's hand. In some embodiments, information captured from the camera(s) 139 and the anatomical information generated by the wearable device 102 are used in conjunction to generate the visual data.

Figure 2:
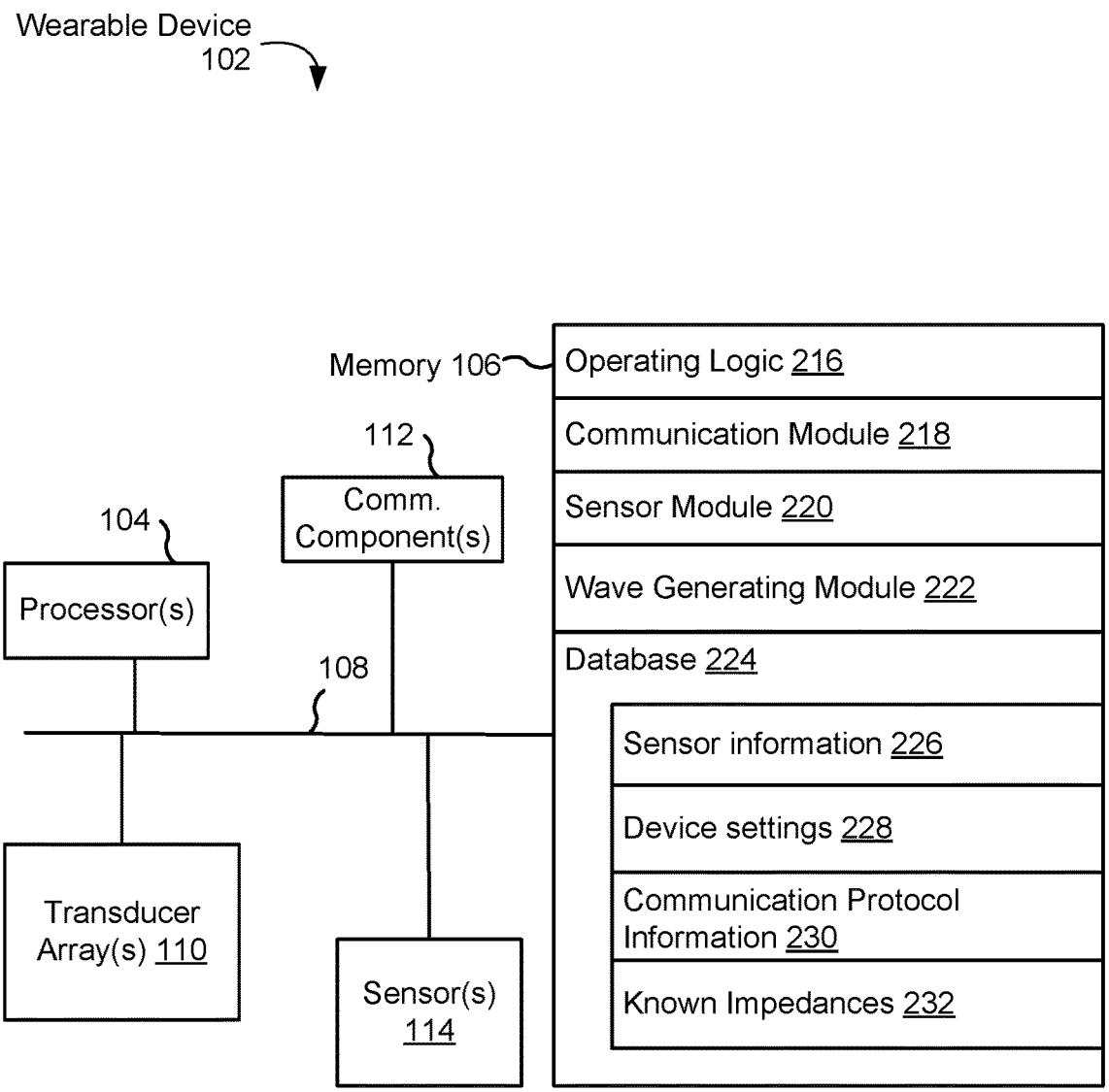
FIG. 2 is a block diagram illustrating an exemplary wearable device in accordance with some embodiments.

FIG. 2 is a block diagram illustrating a representative wearable device 102 in accordance with some embodiments. In some embodiments, the wearable device 102 includes one or more processors/cores (e.g., CPUs, microprocessors, and the like) 104, one or more communication components 112, memory 106, one or more transducer arrays 110, and one or more communication buses 108 for interconnecting these components (sometimes called a chipset). In some embodiments, the wearable device 102 includes one or more sensors 114 as described above with reference to FIG. 1. In some embodiments (not shown), the wearable device 102 includes one or more output devices such as one or more indicator lights, a sound card, a speaker, a small display for displaying textual information and error codes, etc. In some embodiments (not shown), the one or more processors/cores are part of a controller (e.g., controller 412, FIG. 4).

In some embodiments, transducers in a respective transducer array 110 include, e.g., hardware capable of generating the waves 116 (e.g., soundwaves, ultrasound waves, electromagnetic waves, etc.). For example, each transducer can convert electrical signals into ultrasound waves (or various other waves). The transducers may be miniature piezoelectric transducers, capacitive transducers, single or multipole voice coil motors, and/or any other suitable device for creation of waves 116.

In some embodiments, the one or more transducer arrays 110 are coupled with (or include) an oscillator and/or a frequency modulator that is used to generate the waves so that the waves are appropriate for transmission. The oscillator and the frequency modulator may be part of an integrated circuit included in the wearable device 102.

The communication component(s) 112 (sometimes referred to herein "radio(s)") enable communication between the wearable device 102 and other devices (e.g., the computer system 130). In some embodiments, the communication component(s) 112 include, e.g., hardware capable of data communications using any of a variety of wireless protocols (e.g., IEEE 802.15.4, Wi-Fi, ZigBee, 6LoWPAN, Thread, Z-Wave, Bluetooth Smart, ISA100.11a, WirelessHART, MiWi, etc.) wired protocols (e.g., Ethernet, HomePlug, etc.), and/or any other suitable communication protocol, including communication protocols not yet developed as of the filing date of this document.

The memory 106 includes high-speed random access memory, such as DRAM, SRAM, DDR SRAM, or other random access solid state memory devices; and, optionally, includes non-volatile memory, such as one or more magnetic disk storage devices, one or more optical disk storage devices, one or more flash memory devices, or one or more other non-volatile solid state storage devices. The memory 106, or alternatively the non-volatile memory within memory 106, includes a non-transitory computer-readable storage medium. In some embodiments, the memory 106, or the non-transitory computer-readable storage medium of the memory 106, stores the following programs, modules, and data structures, or a subset or superset thereof:

- operating logic 216 including procedures for handling various basic system services and for performing hardware dependent tasks;
- communication module 218 for coupling to and/or communicating with remote devices (e.g., computer system 130, other wearable devices, etc.) in conjunction with communication component(s) 112;
- sensor module 220 for obtaining and processing sensor data (e.g., in conjunction with sensor(s) 114 and/or transducer arrays 110) to, for example, determine an orientation of the wearable device 102 (among other purposes such as determining hand pose of the user of the wearable device);
- wave generating module 222 for generating and transmitting (e.g., in conjunction with transducers(s) 110) waves, including but not limited to creating haptic stimulation(s) and anatomical information). In some embodiments, the wave generating module 222 also includes or is associated with a characteristic selection module that is used to select values of characteristics for generating the waves; and
- database 224, including but not limited to:
  - sensor information 226 for storing and managing data received, detected, and/or transmitted by one or more sensors (e.g., sensors 114, one or more remote sensors, and/or transducer arrays 110), including anatomical information;
  - device settings 228 for storing operational settings for the wearable device 102 and/or one or more remote devices (e.g., selected values of characteristics for the waves);
  - communication protocol information 230 for storing and managing protocol information for one or more protocols (e.g., custom or standard wireless protocols, such as ZigBee, Z-Wave, etc., and/or custom or standard wired protocols, such as Ethernet); and
  - known impedances information 232 for storing impedances for various users of the wearable device.

In some embodiments, the characteristic selection module of the wave generating module 222 is used to select a particular frequency at which to transmit the waves. As discussed above, other characteristics for waves may include phase, gain, amplitude, direction, and the selection module may select particular values for each of those characteristics. In some embodiments, the characteristic selection module selects the values based on information received from the computer system 130 (as explained greater detail below). In some embodiments, the computer system 130 includes the characteristic selection module and provides the relevant characteristics to the wearable device 102.

In some embodiments (not shown), the wearable device 102 includes a location detection device, such as a GNSS (e.g., GPS, GLONASS, etc.) or other geo-location receiver, for determining the location of the wearable device 102. Further, in some embodiments, the wearable device 102 includes location detection module (e.g., a GPS, Wi-Fi, magnetic, or hybrid positioning module) for determining the location of the wearable device 102 (e.g., using the location detection device) and providing this location information to the computer system 130.

In some embodiments (not shown), the wearable device 102 includes a unique identifier stored in database 224. In some embodiments, the wearable device 102 sends the unique identifier to the computer system 130 to identify itself to the computer system 130. This is particularly useful when multiple wearable devices are being concurrently used.

In some embodiments (not shown), the wearable device 102 includes an inertial measurement unit (IMU) for detecting motion and/or a change in orientation of the wearable device 102. In some embodiments, the detected motion and/or orientation of the wearable device 102 (e.g., the motion/change in orientation corresponding to movement of the user's hand) is used to manipulate an interface (or content within the interface) displayed by the head-mounted display 140. In some embodiments, the IMU includes one or more gyroscopes, accelerometers, and/or magnetometers to collect IMU data. In some embodiments, the IMU measures motion and/or a change in orientation for multiple axes (e.g., three axes, six axes, etc.). In such instances, the IMU may include one or more instruments for each of the multiple axes.

Each of the above-identified elements (e.g., modules stored in memory 106 of the wearable device 102) is optionally stored in one or more of the previously mentioned memory devices, and corresponds to a set of instructions for performing the function(s) described above. The above identified modules or programs (e.g., sets of instructions) need not be implemented as separate software programs, procedures, or modules, and thus various subsets of these modules are optionally combined or otherwise rearranged in various embodiments. In some embodiments, the memory 106, optionally, stores a subset of the modules and data structures identified above. Furthermore, the memory 106, optionally, stores additional modules and data structures not described above.

Figure 3:
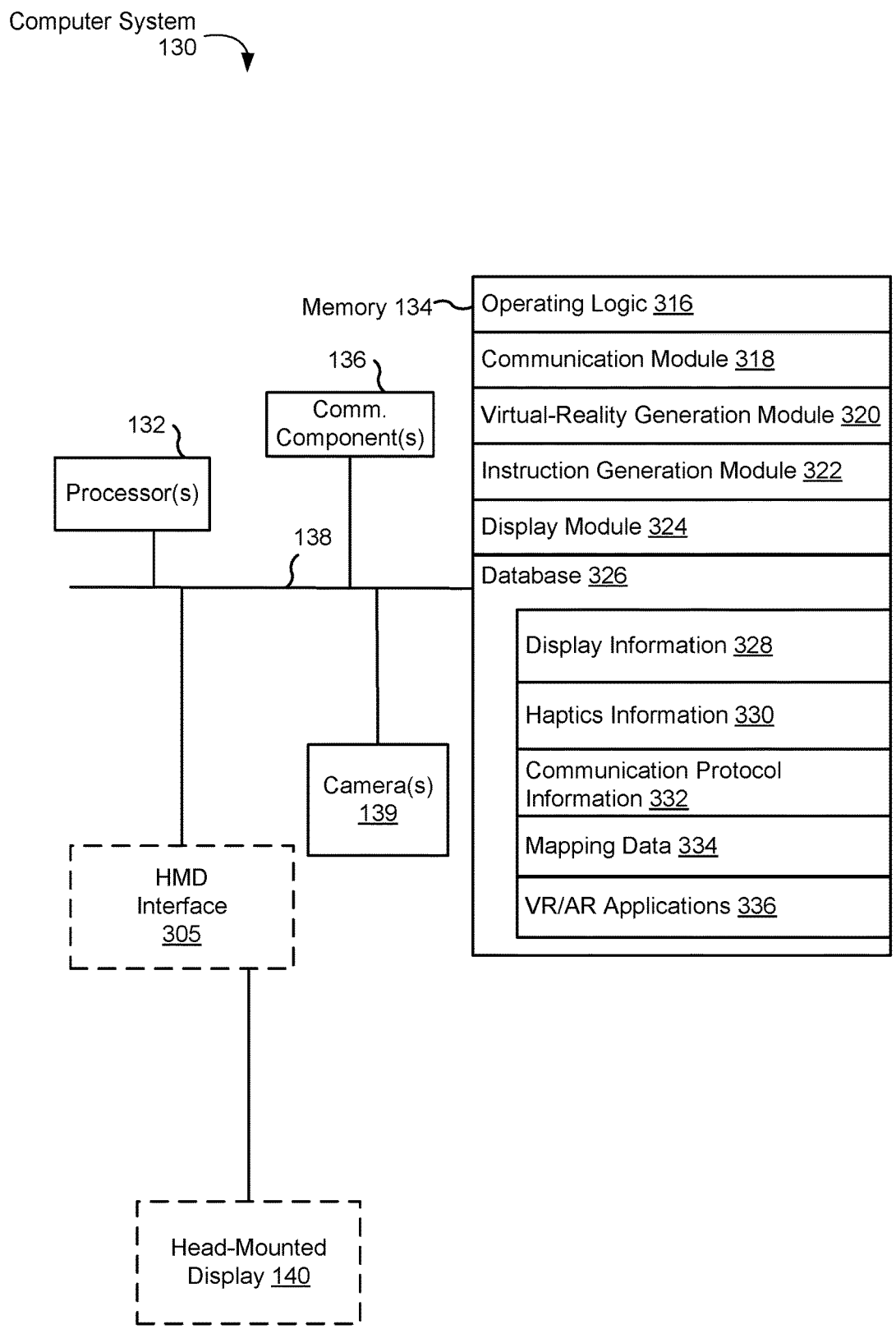
FIG. 3 is a block diagram illustrating an exemplary computer system in accordance with some embodiments.

FIG. 3 is a block diagram illustrating a representative computer system 130 in accordance with some embodiments. In some embodiments, the computer system 130 includes one or more processors/cores (e.g., CPUs, GPUs, microprocessors, and the like) 132, one or more communication components 136, memory 134, one or more cameras 139, and one or more communication buses 138 for interconnecting these components (sometimes called a chipset). In some embodiments, the computer system 130 includes a head-mounted display interface 305 for connecting the computer system 130 with the head-mounted display 140. As discussed above in FIG. 1, in some embodiments, the computer system 130 and the head-mounted display 140 are together in a single device, whereas in other embodiments the computer system 130 and the head-mounted display 140 are separate from one another (e.g., two separate device connected wirelessly or wired).

Although not shown, in some embodiments, the computer system 130 (and/or the head-mounted display 140) includes one or more sensors 145 (as discussed above with reference to FIG. 1).

The communication component(s) 136 enable communication between the computer system 130 and other devices (e.g., wearable devices 102a . . . 102n). In some embodiments, the communication component(s) 136 include, e.g., hardware capable of data communications using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, MiWi, etc.), custom or standard wired protocols (e.g., Ethernet, HomePlug, etc.), and/or any other suitable communication protocol, including communication protocols not yet developed as of the filing date of this document.

The memory 134 includes high-speed random access memory, such as DRAM, SRAM, DDR SRAM, or other random access solid state memory devices; and, optionally, includes non-volatile memory, such as one or more magnetic disk storage devices, one or more optical disk storage devices, one or more flash memory devices, or one or more other non-volatile solid state storage devices. The memory 134, or alternatively the non-volatile memory within memory 134, includes a non-transitory computer-readable storage medium. In some embodiments, the memory 134, or the non-transitory computer-readable storage medium of the memory 134, stores the following programs, modules, and data structures, or a subset or superset thereof:

- operating logic 316 including procedures for handling various basic system services and for performing hardware dependent tasks;
- communication module 318 for coupling to and/or communicating with other devices (e.g., wearable devices 102a-102-n, a remote server (not shown), etc.) in conjunction with communication component(s) 136;
- virtual-reality generation module 320 that is used for generating virtual-reality images and sending corresponding video and audio data to the HMD 140 (in some embodiments, the virtual-reality generation module 320 is an augmented-reality generation module 320 (or the memory 134 includes a distinct augmented-reality generation module) that is used for generating augmented-reality images and projecting those images in conjunction with the camera(s) 139 and the HMD 140);
- instruction generation module 322 that is used for generating an instruction that, when sent to the wearable device 102 (e.g., using the communications component 136), causes the wearable device 102 to activate one or more transducers;
- display module 324 that is used for displaying virtual-reality images and/or augmented-reality images in conjunction with the head-mounted display 140 and/or the camera(s) 139;
- database 326, including but not limited to:
    - display information 328 for storing virtual-reality images and/or augmented-reality images (e.g., visual data);
    - haptics information 330 for storing haptics information that corresponds to the stored virtual-reality images and/or augmented-reality images;
    - communication protocol information 332 for storing and managing protocol information for one or more protocols (e.g., custom or standard wireless protocols, such as ZigBee, Z-Wave, etc., and/or custom or standard wired protocols, such as Ethernet); and
    - mapping data 334 for storing and managing mapping data (e.g., mapping one or more wearable devices 102 on a user).

In the example shown in FIG. 3, the computer system 130 further includes virtual-reality (and/or augmented-reality) applications 336. In some embodiments, the virtual-reality applications 336 are implemented as software modules that are stored on the storage device and executed by the processor. Each virtual-reality application 336 is a group of instructions that, when executed by a processor, generates virtual reality content for presentation to the user. A virtual-reality application 336 may generate virtual-reality content in response to inputs received from the user via movement of the head-mounted display 140 or the wearable device 102. Examples of virtual-reality applications 336 include gaming applications, conferencing applications, and video playback applications.

The virtual-reality generation module 320 is a software module that allows virtual-reality applications 336 to operate in conjunction with the head-mounted display 140 and the wearable device 102. The virtual-reality generation module 320 may receive information from the sensors 145 on the head-mounted display 140 and may, in turn provide the information to a virtual-reality application 336. Based on the received information, the virtual-reality generation module 320 determines media content to provide to the head-mounted display 140 for presentation to the user via the electronic display 144. For example, if the virtual-reality generation module 320 receives information from the sensors 145 on the head-mounted display 140 indicating that the user has looked to the left, the virtual-reality generation module 320 generates content for the head-mounted display 140 that mirrors the user's movement in a virtual environment.

Similarly, in some embodiments, the virtual-reality generation module 320 receives information from the sensors 114 on the wearable device 102 and provides the information to a virtual-reality application 336. The application 336 can use the information to perform an action within the virtual world of the application 336. For example, if the virtual-reality generation module 320 receives information from the sensors 114 that the user has raised his hand, a simulated hand (e.g., the user's avatar) in the virtual-reality application 336 lifts to a corresponding height. As noted above, the information received by the virtual-reality generation module 320 can also include information from the head-mounted display 140. For example, cameras 139 on the head-mounted display 140 may capture movements of the user (e.g., movement of the user's arm), and the application 336 can use this additional information to perform the action within the virtual world of the application 336.

To further illustrate with an augmented reality example, if the augment-reality generation module 320 receives information from the sensors 114 that the user has rotated his forearm while, in augmented reality, a user interface (e.g., a keypad) is displayed on the user's forearm, the augmented-reality generation module 320 generates content for the head-mounted display 140 that mirrors the user's movement in the augmented environment (e.g., the user interface rotates in accordance with the rotation of the user's forearm).

In some embodiments, the virtual-reality generation module 320 includes a representation generation module. The representation generation module is used for generating at least a partial representation of the user (e.g., a pose of the user's hand) of the wearable device 102 from anatomical information received from the wearable device 102. Further, in some embodiments, the virtual-reality generation module 320 then includes the representation in the visual data to be displayed by the head-mounted display 140. In some embodiments, the virtual-reality generation module 320 includes a gesture recognizing module that is used for identifying a hand gesture based on the partial representation of the user generated by the representation generation module.

In some embodiments, the display information 328 includes anatomical information provided by one or more wearable devices 102. Further, in some embodiments, the display information 328 includes representations (or partial representations) of the user of the wearable device generated from the anatomical information by the representation generation module.

In some embodiments, the known impedances information 232 are also (or only) stored at the computer system 130.

Each of the above identified elements (e.g., modules stored in memory 134 of the computer system 130) is optionally stored in one or more of the previously mentioned memory devices, and corresponds to a set of instructions for performing the function(s) described above. The above identified modules or programs (e.g., sets of instructions) need not be implemented as separate software programs, procedures, or modules, and thus various subsets of these modules are optionally combined or otherwise rearranged in various embodiments. In some embodiments, the memory 134, optionally, stores a subset of the modules and data structures identified above.

FIG. 4 is an example view of the wearable device 400 in accordance with some embodiments. The wearable device 400 is an example of the wearable device 102. The view shows the user's hand 408, user's wrist 404, user's arm 406, and the wearable device 400 on the user's arm 406. Such an arrangement is merely one possible arrangement, and one skilled in the art will appreciate that the discussion below is not limited to the arrangement shown in FIG. 4.

The wearable device 400 includes a wearable structure 402 that may be a flexible mechanical substrate such as a plastic (e.g., polyethylene or polypropylene), rubber, nylon, synthetic, polymer, etc. In some embodiments, the wearable structure 402 is configured to be worn around at least a portion of a user's wrist or arm 404/406 (and various other body parts). In some embodiments, the wearable structure 402 is a continuous band (e.g., does not break apart). In some embodiments, the wearable structure 402 includes two ends that can be connected and broken apart (e.g., similar to the ends of a watch). In some embodiments, the wearable structure 402 is referred to herein as a band.

The wearable device 400 includes a transducer array 110 having a plurality of transducers 410 arranged at different locations on the wearable structure 402. The transducers 410 can be arranged in a pattern along an inner surface of the wearable structure 402 facing the arm 406 such that the transducers 410 contact the user's skin. In another example, the transducers can be arranged in a radial pattern along an inner perimeter of the wearable structure 602 (FIG. 6B).

Each transducer 410 can generate one or more waves (e.g., waves 116, FIG. 1) in response to receiving one or more control signals from a controller 412. The one or more control signals, at least in some embodiments, instruct one or more of the transducers 410 to generate one or more waves (e.g., ultrasonic waves). In some embodiments, the one or more transducers 410 transmit waves into the user's wrist (e.g., to gather anatomical information as shown and described with reference to FIGS. 5A-5B and/or to create haptic stimulations as shown and described with reference to FIGS. 9A-9E). Alternatively or in addition, the one or more transducers 410 transmit one or more waves perpendicular the user's wrist (e.g., to create haptic stimulations).

In some embodiments, the one or more transducers 410 can operate in different modes either simultaneously or in temporal/frequency modulated modes, generating different types of waves 116 that interact with the tissue in different ways. The extra wave types can be utilized to retrieve more abundant information regarding both the static and dynamic, both the anatomical and functional information of the human body, which is further utilized to improve performance. Alternatively or in addition, the operating modes of the one or more transducers 410 can be specifically designed to optimize the stimulation and tracking performance, either via grid-search in parameter space or simulation studies. For example, using visible light near forearm and using near-infrared near wrist may yield better results for certain interaction tasks.

In those embodiments where the one or more transducers 410 transmit waves into the user's wrist to gather anatomical information, the gathered anatomical information can be used to determine a hand pose (among other things) of the user. For example, the captured waves correspond to movement and/or a state of internal bodily structures within the user's wrist or arm 406. A hand position (or hand pose) includes the angle and position of the palm, knuckles, and fingers of the user's hand and includes parameters corresponding to joints of the hand, edges between pairs of the joints, and angles between pairs of the edges, as illustrated and described in greater detail below with reference to FIG. 5C. In some embodiments, the wearable device 400 includes one or more sensors (e.g., sensors 114, FIG. 1) mounted on the wearable structure 402 to measure impedance of the user's wrist or arm. In some embodiments, anatomical information gathered by the wearable device 400 may be used to render a full hand model in a virtual reality system and/or track human-object interaction in real environments.

In those embodiments where the one or more transducers 410 transmit waves into the user's wrist to gather raw sensor information, and such procedure is repeated on multiple users for multiple trials to form a database. Computer models, both algebraic algorithms based on anatomical information or heuristic observations, and machine learning algorithms that generate a mapping based on the collected database, can be established to determine a hand pose of the user.

In those embodiments where the one or more transducers 410 transmit waves to create haptic stimulations, each transducer 410 on the wearable device 400 functions individually to create the haptic stimulation. Alternatively, in some embodiments, two or more transducers function together to create the haptic stimulation. In some embodiments, less than all the transducers function to create the haptic stimulation. For example, a first group of transducers (one or more transducers) may function to create first haptic stimulation and a second group of transducers having at least one different transducer may function to create second haptic stimulation. In some embodiments, a threshold number of transducers is needed to create the haptic stimulation. For example, two or more transducers need to generate waves in order for the haptic stimulation to be felt by a user of the wearable device. In some embodiments, a magnitude of the haptic stimulation felt by the user increases as the number of transducers generating waves increases. "Haptic stimulations" (e.g., tactile feedback) include but are not limited to a touch stimulation, a swipe stimulation, a pull stimulation, a push stimulation, a rotation stimulation, a heat stimulation, and/or a pain stimulation. Haptic stimulations are discussed in further detail below with reference to FIGS. 9A-9E.

In some embodiments, the transducers 410 are designed to make contact with human skin. A contact area having a conductive agent and padding may be used on the wearable device 400 behind each transducer to improve subject comfort and reduce contact impedances (e.g., conductive agent 502, FIG. 5A). The conductive agent between the transducer and skin may be a "wet" connection using a conductive gel, which may consist of propylene glycol and NaCl, or a "dry" connection, such as a thin layer of conductive polymer (e.g., carbon-doped PDMS).

It is further noted that the description below with reference to FIGS. 5A-5C applies equally to the wearable device 600. In other words, the wearable device 600 can also be used to generate anatomical information (e.g., tomographic information).

Figure 5A:
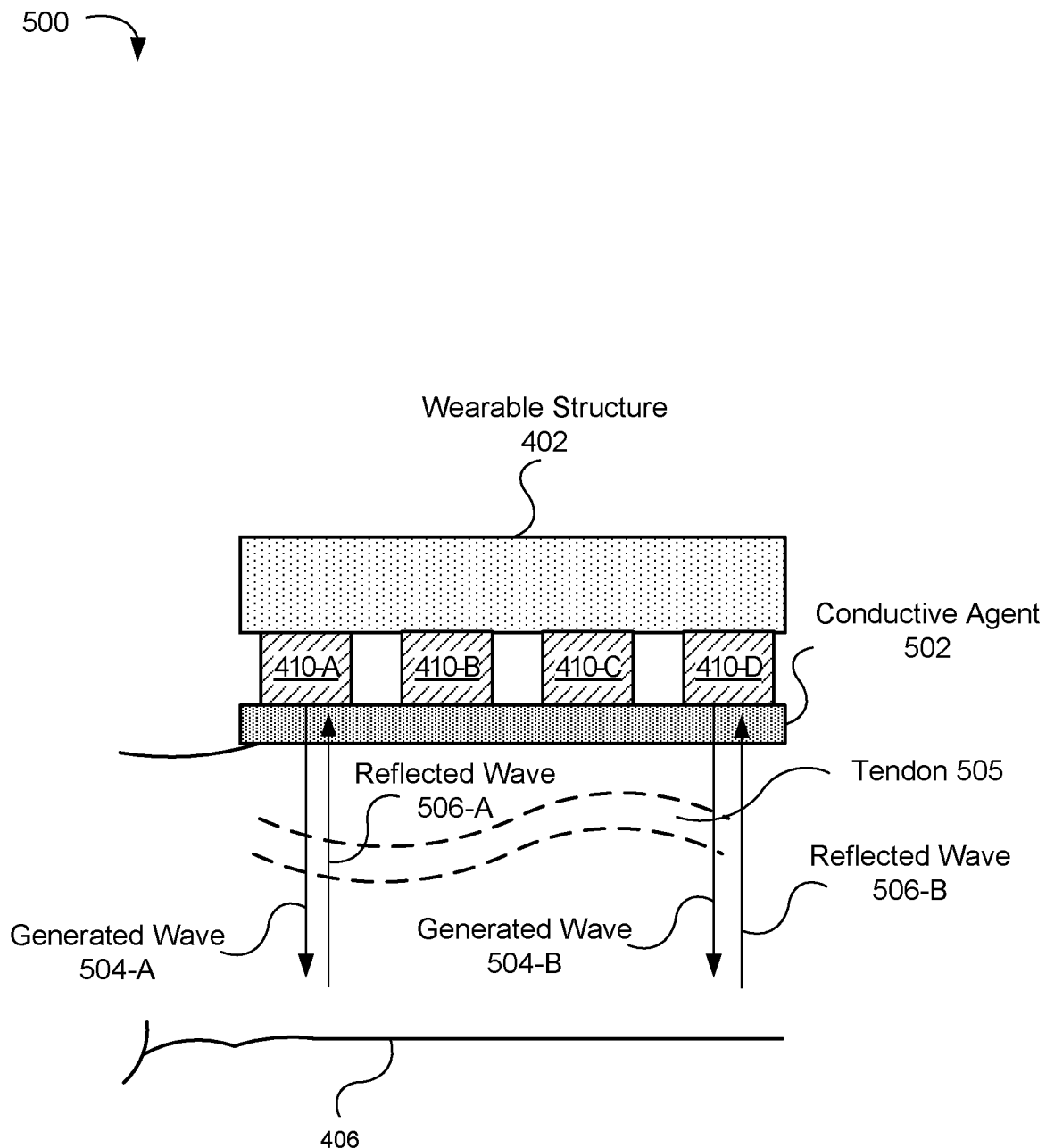
FIG. 5A is an exemplary cross-sectional view of a wearable device on the user's wrist in accordance with some embodiments.

FIG. 5A is an example cross sectional view 500 of the wearable device 400 taken along the X-Y line shown in FIG. 4, in accordance with some embodiments. The cross sectional view 500 shows the user's arm 406 and a tendon 505 within the user's arm 406. In this particular example, the transducers 410 do not fully wrap around the wrist (e.g., transducers 410-A-410-D are disposed on one side of the user's arm 406).

One or more of the transducers 410-A-410-D can generate waves (e.g., waves 504-A and 504-B) in the user's arm 406. The generated waves 504-A and 504-B extend into the user's body (e.g., extend into the epidermis, the dermis, the muscles, the tendons, the ligaments, the bones, etc.) and may be used to gather anatomical information about the user, which is in turn used to determine a hand pose of the user. In some embodiments, each transducer 410 varies one or more of a time period of the wave, an amplitude of the wave, and a phase of the wave when generating the waves.

In some embodiments, the wearable device 400 uses ultrasound computer tomography (USCT) to generate tomographic information. USCT involves generating one or more waves (e.g., ultrasound waves) from one or more transducers 410 (e.g., piezoelectric ultrasound transducers) in the direction of the object to be measured (e.g., toward the user's wrist/forearm/hand, as shown in FIG. 5A). The transmitted waves are then received by other transducers (e.g., as shown in FIG. 5B) or by the same transducers that generated the one or more waves (e.g., as shown in FIG. 5A), or some combination thereof. While travelling to the receiving location, the one or more waves interact with one or more objects (e.g., muscles, tendons, bones, blood vessels, skin, etc.) and as a consequence, the one or more waves may be altered by the object(s). The altered ultrasound waves reveal information about the object(s), and after being received, the information from the altered one or more waves can be processed and used to create an image of the object(s) (e.g., create an image of the user's muscles, tendons, bones, blood vessels, skin, etc. below the wearable device). In some instances, multiple forms of information can be extracted from the altered waves. For example, the information can include but is not limited to: attenuation the wave's sound pressure experiences indicate on the object's attenuation coefficient, the time-of-flight of the wave provides speed of sound information, and scattering of the wave indicates the echogenicity of the object (e.g. refraction index, surface morphology, etc.). For example, as shown in FIG. 5B, the generated wave 512-A changes direction upon interacting with the tendon 505, and the refracted wave 514-A results.

In FIG. 5A, the generated waves 504-A, 504-B, or a portion of the waves 504-A, 504-B, are reflected by the tendon 505 and/or a portion of the wearable structure 402. As a result, the reflected waves 506-A, 506-B are received by the transducers 410-A and 410-D. In some instances, the same transducers that generate the waves do not receive the waves. For example, in FIG. 5B, the generated waves 512-A, 512-B, which are generated by transducers 410-A and 410-C, are alter by the tendon 505 and the refracted waves 514-A, 514-B are then received by transducers 410-F and 410-H. It is noted that other techniques known by those skilled in the art can be used to generate the tomographic information (e.g., electrical impedance tomography, infrared tomography, pressure tomography, and the like). Additionally, in some embodiments, the anatomical information is not tomographic information. Instead, the anatomical information is derived from direct voltage changes and other non-image sensor analysis.

The wearable device 400 may measure any or all of muscle contractions, tendon 505 motion, tendon 505 length, and joint stiffness in order to determine, as an example, the hand position of the user's hand 408 (e.g., using USCT, or other similar techniques). For example, combinations of such values measured from the user's arm 406 can indicate the angle formed by bones between joints within the user's hand 408. The position of the hand can be represented by a collection of values representing the angles formed between joints in the hand as derived from the waves.

The wearable device 400 operates by determining the state of structures within the user's body, e.g., state of structures within the arm 406 that is connected to the hand 408 by the wrist. For example, the state of bones such as the radius and ulna, the radial styloid and the ulnar styloid, the carpal bones, the metacarpals, etc., may be determined to identify the position of the user's hand 408. The state of joints such as the carpometacarpophalangeal joint, the metacarpophalangeal joint, and the interphalangeal joint, etc., may be determined from the waves to identify the position of the user's hand 408. The state of muscles such as intrinsic muscles, tendons such as the flexor tendons, extensor tendons, tendon sheaths, and median nerve and ulnar nerve may be determined from the waves to identify the position of the user's hand 408. Among other advantages, the wearable device 400 can determine user hand pressure when holding objects and can distinguish between a user who is grasping an object in the hand 408 and a user who is making a grasping gesture with an empty hand 408.

In some embodiments, the transducers 410 transmit waves into the user's body in a staggered manner, where a different subset of the transducers transmit waves at different times. In some embodiments, the remaining transducers may be used to measure the altered waves. This procedure may then be repeated for multiple stimulation patterns defining an order of pairs of transducers selected to emit the waves.

The anatomical information (e.g., tomographic information) derived from the waves/signals may be sent to a computing system 130 (e.g., a separate host system or a processor integrated with the wearable device 400) to perform image reconstruction and display based at least in part on the waves. In other example, the computing system 130 may use the anatomical information of the user's wrist to determine a position/pose of the user's hand attached to said wrist.

Figure 5B:
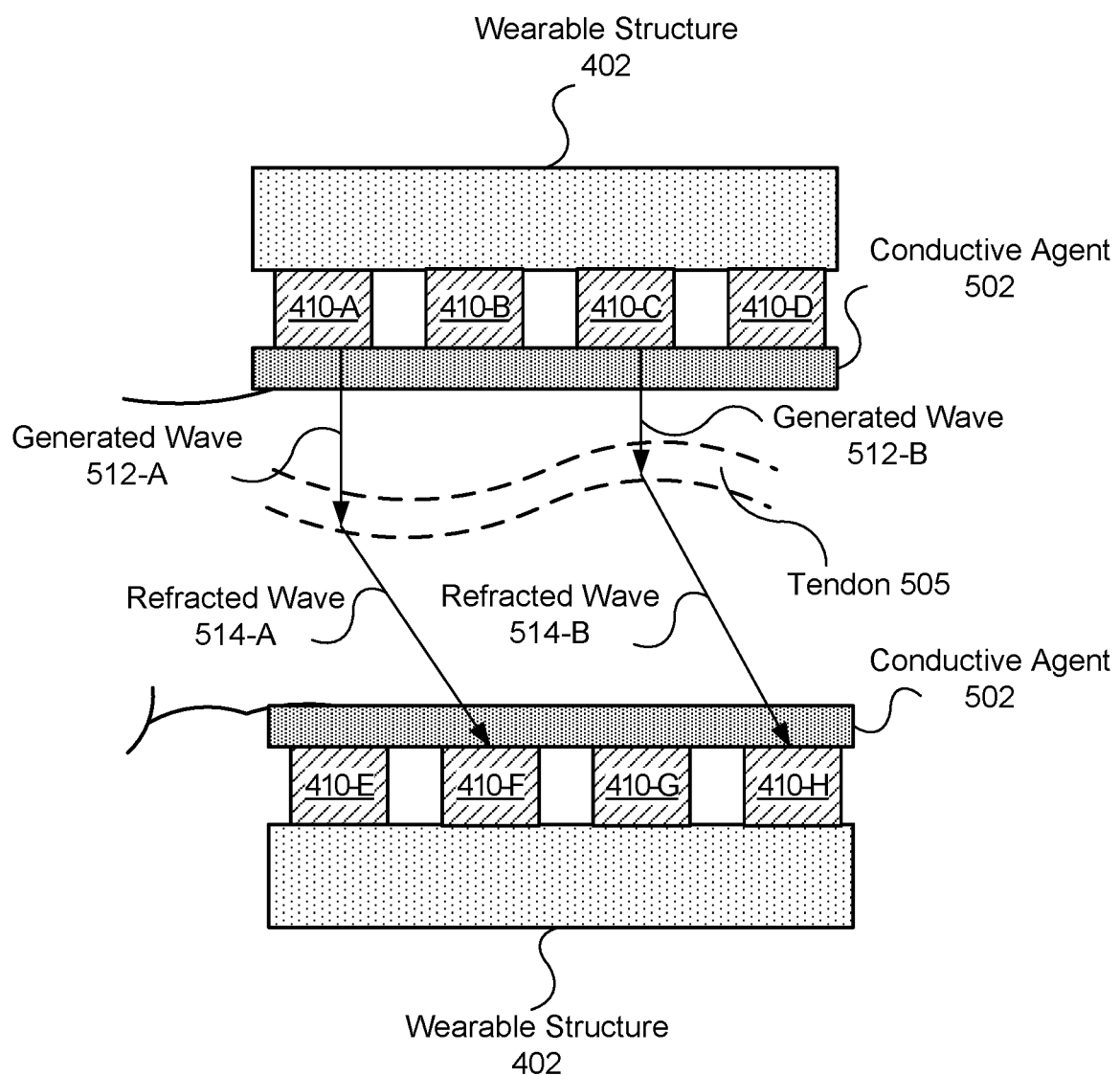
FIG. 5B is an exemplary cross-sectional view of a wearable device on the user's wrist in accordance with some embodiments.

FIG. 5B is an example cross sectional view 510 of the wearable device 400 taken along the X-Y line shown in FIG. 4, in accordance with some embodiments. The cross sectional view 510 shows the user's arm 406 and a tendon 505 within the user's arm 406. In this particular example, the transducers 410 wrap fully around the wrist (e.g., transducers 410-A-410-H are disposed around the user's arm 406). One or more transducers on one side of the arm 406 may generate waves (e.g., waves 512-A and 512-B) into the user's arm and one or more transducers on another side of the arm 406 may receive waves (e.g., waves 514-A and 514-B) traveling through the tendon 505 of the user's arm 406. In this manner, the system is able to measure crosssectional impedance properties of the wrist or arm 406. It is noted in some embodiments, a combination of what is shown in FIG. 5A and what is shown in FIG. 5B is obtained (e.g., some waves reflect back towards the direction of generation as shown in FIG. 5A while some waves continue toward the other side of the wearable device 400).

Figure 5C:
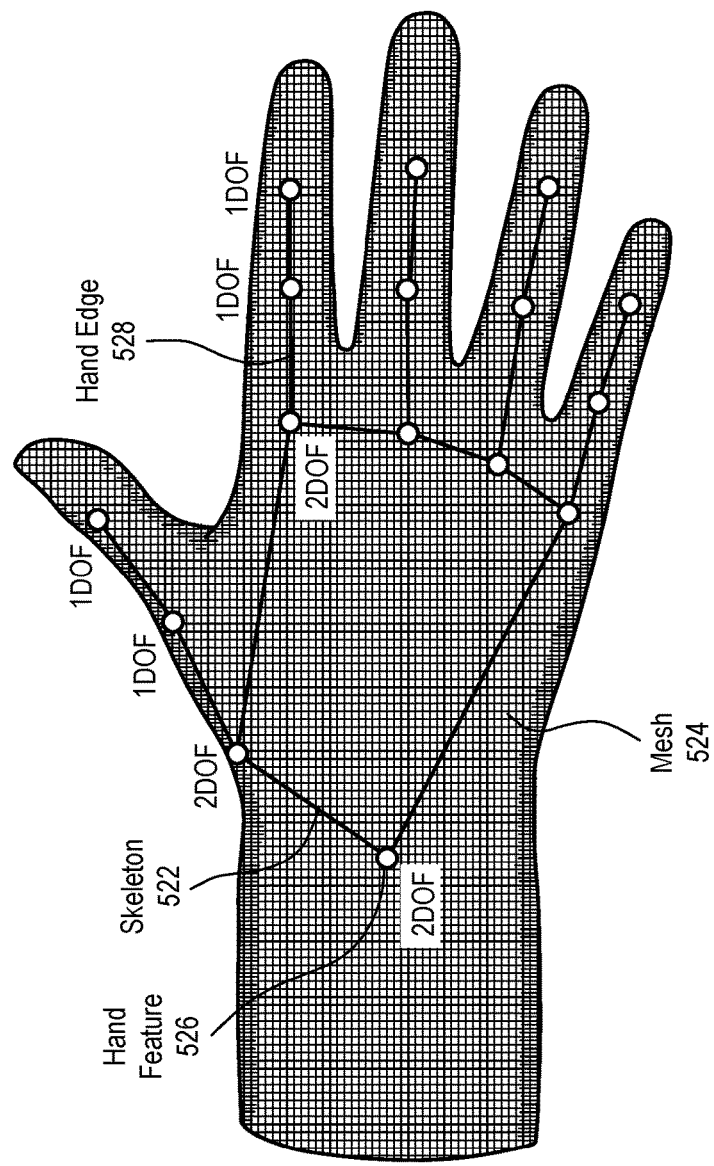
FIG. 5C is an example illustration of a hand shape model of a user, in accordance with some embodiments.

FIG. 5C is an example illustration of a hand shape model 520 of a user in accordance with some embodiments. In some embodiments, the hand position of the user is represented with reference to the hand shape model 520. For example, the tomographic information gathered using USCT may be compared to the hand shape model 520. In some embodiments, the hand shape model 520 is stored in the memory 106 and/or the memory 134.

The hand shape model 520 includes parameters that correspond to joints of the hand 406 of the wrist or arm 408 of the user, edges between pairs of the joints, range of angles between pairs of the edges, and a mesh including vertices and for each vertex, a relationship (e.g., distance) between the vertex and one or more joints. In some embodiments, the waves (e.g., sound waves, ultrasound waves, etc.) generated by the wearable device 400 are used to determine the hand position with reference to the hand shape model 520, such as the angles defined between pairs of edges between joints.

The hand shape model 520 defines a deformable shape and size of the hand 120. For example, hand shape model 520 includes a skeleton 522 and a mesh 524. The skeleton 522 includes hand features 526, representing nodes (joints) of the skeleton 522. At least some hand features 526 have fixed distances between other hand features 526, which is shown by the hand edges 528 of the skeleton 522. The hand edges 528 are models for bones of the hand 408, and the hand features 526 are models for joints that connect the bones.

Each hand feature 526 is associated with one or more degrees of freedom (DOF) defining the range of motion of the joint. For example, the hand feature at the wrist includes two degrees of freedom (e.g., pitch and yaw). In another example, the hand features 526 at each knuckle include two degrees of freedom (e.g., roll and yaw). In yet another example, the hand features 526 at each finger joint include one degree of freedom (e.g., yaw). Degrees of freedom may include rotational or translational degrees of freedom. Each degree of freedom may be associated with a range of values, such as may be defined by a maximum value and a minimum value, representing how much a joint can move along the degree of freedom. A hand position is defined by a particular state of the hand shape model 520. For example, a set of values for each degree of freedom of the hand features 526 may define a particular hand pose.

The mesh 524 of the hand shape model 520 defines the surface of the user hand model 520. The mesh 524 may include vertices, where each vertex is attached with a part of the skeleton 522, such as a hand feature 526 or location along a hand edge 528. The vertices when interconnected form a polygon mesh defining a model of the hand surface. For example, a vertex may have a predefined distance from an attached hand feature 526. If a hand feature 526 is moved, the attached vertices move accordingly such that the mesh 524 changes with movement of the skeleton 522. In some embodiments, vertices of the mesh 524 may be attached to more than one location of the skeleton 522.

Figure 6A:
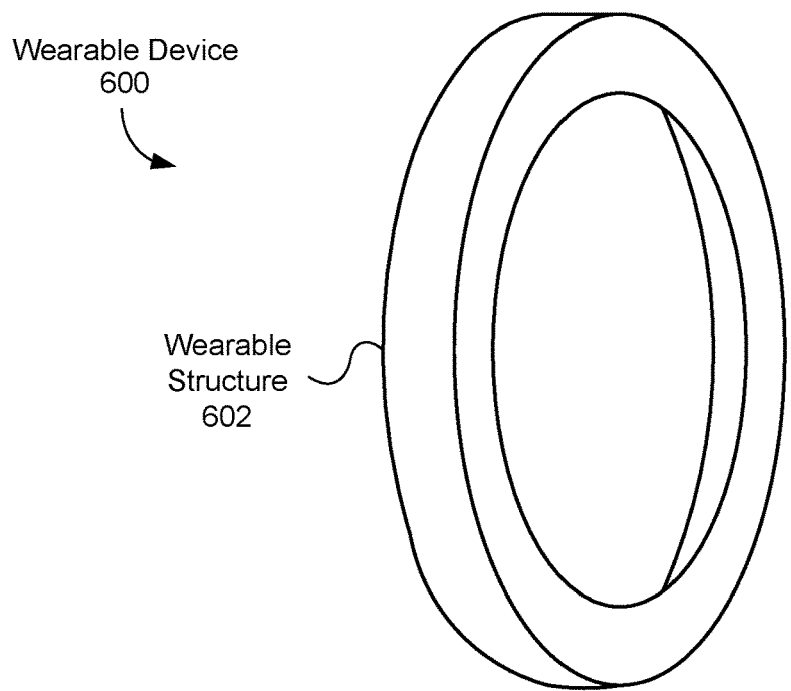
FIGS. 6A and 6B are exemplary views of a wearable device in accordance with some embodiments.
Figure 6B:
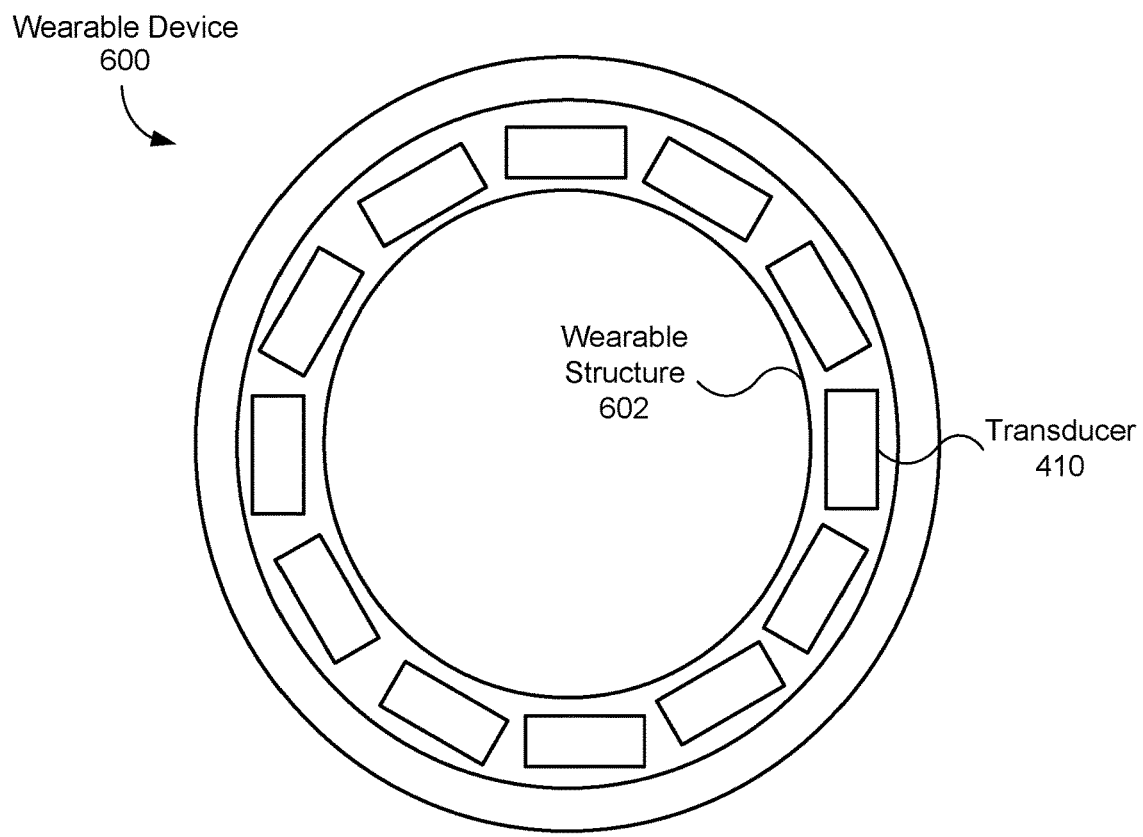

FIG. 6A is an isometric view of the wearable device 600 in accordance with some embodiments. The wearable device 600 is an example of the wearable device 102. The wearable device 600 is configured to be attached to a part of a user's body. For example, the wearable device 600 is configured to be attached to a wrist, forearm, ankle, bicep, calf, thigh, and various other parts of the user's body. In some embodiments, the wearable device 600 is a rigid or semi-rigid structure. Alternatively, in some embodiments, the wearable device 600 is a flexible structure. Although the wearable device 600 is shown as a continuous circle, the wearable device 600 may break apart to be attached to the user's body (e.g., in a similar fashion to a watch).

FIG. 6B is a cross-sectional view of the wearable device 600 in accordance with some embodiments. The wearable device 600 further includes a plurality of transducers 410 (FIG. 4) positioned along an inner perimeter of the wearable structure 602. The transducers 410 in this example are radially spaced, such that the transducers 410 wrap around the wearable structure 602 and form a substantially contiguous circle of transducers. In such an arrangement, the wearable device 600 is able to produce waves 116 in a 360-degree fashion. In some embodiments, the wearable structure 602 separates the transducers 410 from the user's skin. Alternatively, in some embodiments (not shown), the transducers 410 are in direct contact with the user's skin (a conductive agent may also be included, as described above with reference to FIG. 4).

Figure 7A:
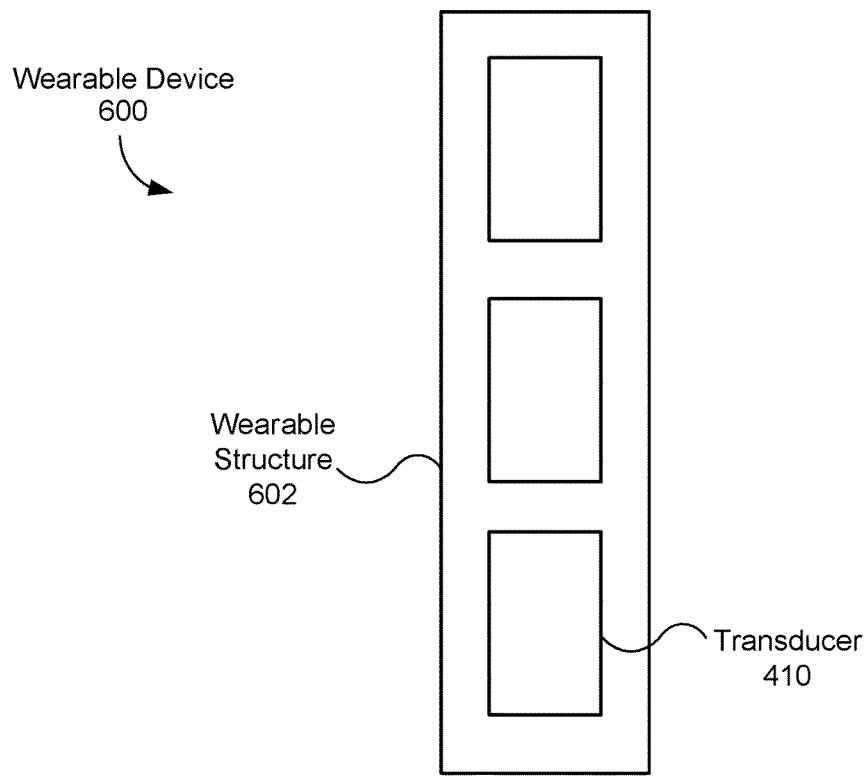
FIGS. 7A and 7B are cross-sectional views of the wearable device of FIG. 6A in accordance with some embodiments.
Figure 7B:
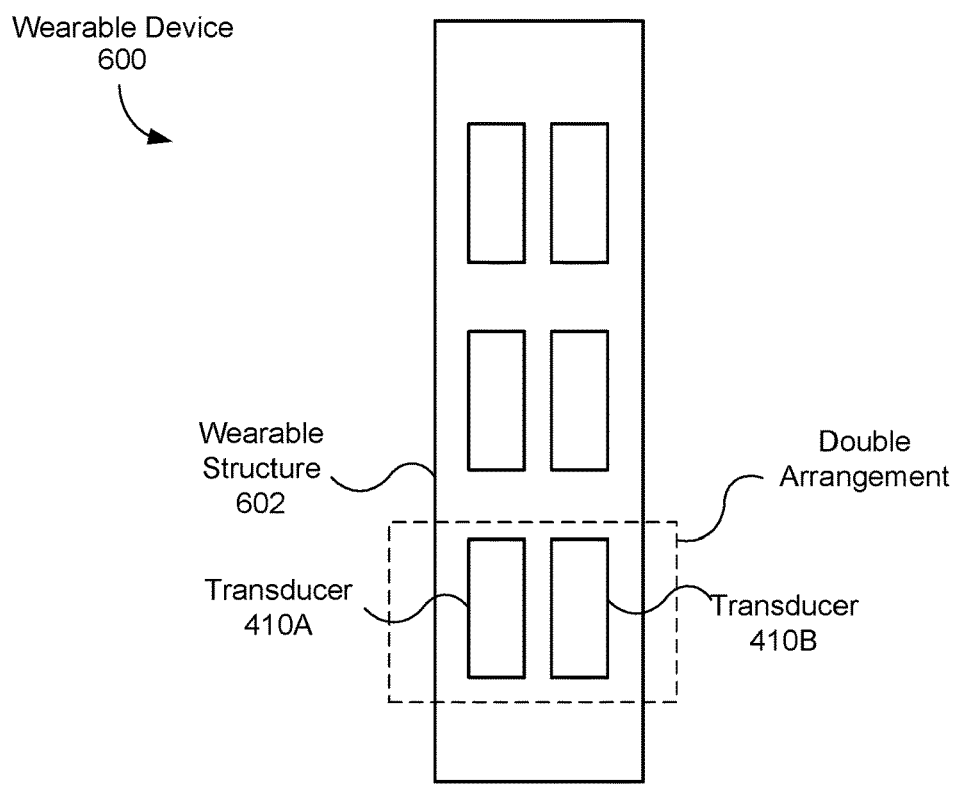

FIGS. 7A-7B are cross-sectional views of the wearable device 600 in accordance with some embodiments. FIG. 7A illustrates a single arrangement of transducers 410 along a length of the wearable structure 602. FIG. 7B illustrates a double arrangement of transducers 410A, 410B along the length of the wearable structure 602 (other arrangements are possible, such as a triple arrangement). In some embodiments (not shown), the transducers are staggered such that transducers in a given row are not parallel, but are instead offset from one another.

FIG. 8 illustrates the wearable device 600 attached to a user's wrist. Left of the wearable device 600 is the user's arm 802 and right of the wearable device 600 is the user's hand 804. The wearable device 600 could also be attached to a user's ankle, or various other body parts.

The discussion below with reference to FIGS. 9A-9B describes a process for creating localized haptic stimulations on a user of the wearable device (e.g., waves 116 stimulate areas of the wearer's body outside of the wearable device's 600 immediate area of contact).

FIG. 9A is a cross-sectional view 900 of the wearable device 600 taken along "A" view, in accordance with some embodiments. The user's arm has been removed from FIG. 9A for ease of illustration. In this particular example, two transducers 410A, 410B are activated (indicated by shading), and each is generating a respective wave 116a, 116b. In some embodiments, the wearable device 600 selectively activates a subset of the transducer array 110 (e.g., two shaded transducers 410A and 410B) based at least in part on a desired target location. In response to being activated, the two transducers 410A and 410B each generates a wave 116a, 116b that impacts the user's body at an impact location. The generated waves 116a, 116b, at least initially, travel perpendicular to the user's skin.

FIG. 9B is an example top view 902 that shows the wearable device 600 and the user's arm taken along "B" view, in accordance with some embodiments. The two waves 116a, 116b generated by the two transducers 410A and 410B now parallel the user's body and are using the hand 804 as a medium. The two waves 116a, 116b propagate within a sublayer of the body away from an impact location. In some embodiments, a direction of the two waves 116a, 116b is different, such as normal to and tangential with the skin, which can lead to different conduction velocities and attenuation. For example, one of the waves may initially travel perpendicular to the user's arm while another wave may initially travel parallel to the user's arm.

Figure 12:
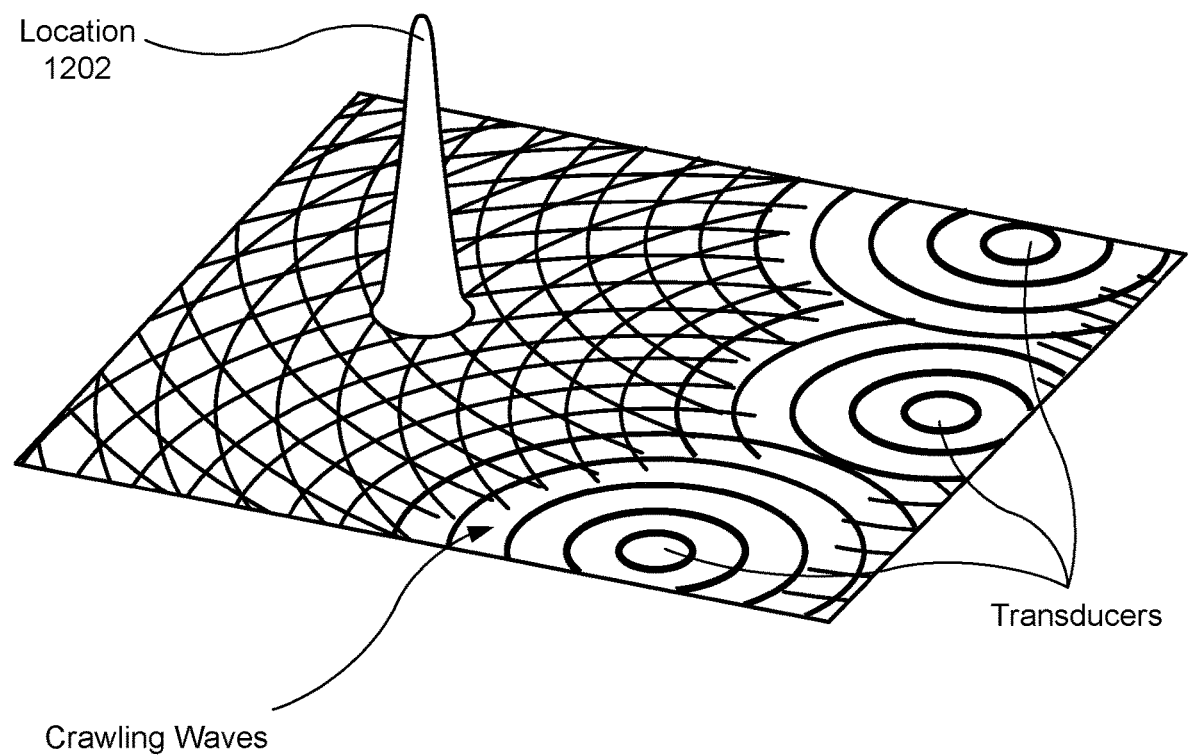
FIG. 12 illustrates multiple crawling waves constructively interfering with one another.

Values for characteristics of each wave are selected by the wearable device 600 (or the host system 130) so that the two waves 116a, 116b constructively interfere at the target location 912. The two waves 116a, 116b in FIG. 9B are shown as being substantially sinusoidal in shape. However, in some instances, the two waves 116a, 116b resemble ripples on a body of water (e.g., as shown in FIG. 12). In such instances, the first wave 116a creates a first ripple (e.g., a first crawling wave) that propagates within a sublayer of the body away from the impact location and the second wave 116b creates a second ripple (e.g., a second crawling wave) that propagates within a sublayer of the body away from the impact location. Based on the characteristics of the ripples, the propagation medium, and a spacing of the two impact locations, the two waves 116a, 116b constructively interfere at the target location 912.

Constructive interference of waves occurs when two or more waves 116 are in phase with each other and converge into a combined wave such that an amplitude of the combined wave is greater than amplitude of a single one of the waves. For example, the positive and negative peaks of sinusoidal waveforms arriving at a location from multiple transducers "add together" to create larger positive and negative peaks. In some embodiments, a haptic stimulation is felt (or a greatest stimulation is felt) by a user at a location where constructive interference of waves occurs (i.e., at the target location). Thus, to create an intense haptic stimulation, a greater number of transducers may be activated, whereby more waves "add together." It is noted that a user may also feel the waves travelling through the medium to the target location; however, these haptic stimulations will be less noticeable relative to the haptic stimulation created and felt at the target location (i.e., where waves "add together").

As one example, two transducers of the wearable device 102 can produce waves (i.e., vibrations) that have respective frequencies of, say, 10,000,000 and 10,000,010 Hz. In such a circumstance, the user would feel 10 Hz (i.e., would feel the beat frequency) even though the produced waves have respective frequencies of 10,000,000 and 10,000,010 Hz. In another example, if a single transducer produces a wave with a frequency of 10,000,000 Hz, but the amplitude of the wave is modulated at 10 Hz (e.g., amplitude modulation, AM), the user will feel the 10 Hz. Using this concept, multiple waves modulated at 10 Hz can be focused (i.e., constructively interfere) at a target location by using multiple transducers with waves out of phase, or by having the AM from the transducers out of phase.

The discussion below further explains the "crawling waves." It is also noted that any number of transducers may be activated depending on the circumstance.

Oscillations or vibrations travel along (e.g., within) the wearer's body as a result of a wave 116 being generated by a transducer 410. The resulting oscillations or vibrations from the wave 116 are sometimes referred to herein as crawling waves (the "crawling wave phenomena"). In the present context, the crawling wave phenomena refers to two or more sources (i.e., transducers) with different harmonic/acoustic (or the same) excitations that induce moving interference patterns in the wearer's body. A crawling wave generated by a transducer moves through the wearer's body with a phase velocity (v) that depends on the harmonic frequencies (f1, f2), and the shear wave speed (s). In some embodiments, the following equation represents the phase velocity (v) of a crawling wave:

$$v = s(f1-f2)\sqrt{4f1 \cdot f2}$$

As an example, when f1=500 Hz, f2=501 Hz, s=5 m/s, a phase velocity of v≈1 cm/s results. In some embodiments, values for the parameters of the equation above are provided by the computer system 130, or the values are calculated by the wearable device 600 based on an instruction from the computer system 130.

An example of multiple crawling waves constructively interfering with one another is illustrated in FIG. 12. As shown, the crawling waves constructively interfere at location 1202, which corresponds to a haptic stimulation. In some embodiments, time reversal focusing techniques are used to determine parameters of the crawling waves illustrated in FIG. 12, as explained below. For example, the determined parameters are used to create the haptic stimulation at location 1202 (FIG. 12).

In some embodiments, the transducers 410 focus ultrasound waves into the user using time reversal signal processing. In other words, the wearable device is a device that can focus waves using a time reversal method. Time reversal signal processing takes advantage of wave reciprocity, which is not altered by non-linear media, such as the user's skin. To focus the ultrasound waves using time reversal techniques, for each of the transducers 410, the wearable device activates the respective transducers (e.g., each transducer shown in FIG. 12) with a test signal and measures the response at the respective target location (e.g., location 1202, FIG. 12). Various instruments can be used to measure the response at the respective target location, including but not limited to a laser Doppler vibrometer. Thereafter, the measured signals are time-reversed. By activating the transducers 410 (e.g., all or less than all) with time-reversed versions of the measured signals, an excited skin (or other media) response can be created at the target location (e.g., the signals constructively interfere at the target location). As one skilled in the art will appreciate, in some instances, the parameters of each crawling wave are the same, whereas in some other instances, the parameters of crawling waves differs. Moreover, a first transducer may be activated at a first time and a second transducer may be activated at a second time (e.g., after the first time) (or in some embodiments, each transducer is activated simultaneously).

The discussion below with reference to FIGS. 9C-9E describes a process for creating haptic stimulations on a user of the wearable device (e.g., waves 116 create stimulations felt at or near the wearable device's area of contact).

FIG. 9C is a cross-sectional view 920 of the wearable device 600 taken along "A" view (FIG. 8), in accordance with some embodiments. The user's arm has been removed from FIG. 9C for ease of illustration. As shown, two transducers 410A, 410B are activated (indicated by shading), and each is generating a respective wave 116a, 116b (shown coming out of the page). In some embodiments, the wearable device 600 selectively activates a subset (e.g., two shaded transducers 410A and 410B) of the transducer array 110 based on an instruction received from the remote device 130 (FIG. 1). In response to being activated, the two transducers 410A and 410B each generates a wave 116a, 116b that parallels the user's arm 802 and hand 804. In doing so, a haptic sensation is created (e.g., a pull stimulation is felt at the user's wrist, or some other stimulation).

FIG. 9D is an example top view 930 that shows the wearable device 600 and the user's arm taken along "B" view (FIG. 8), in accordance with some embodiments. As shown, the two waves 116a, 116b generated by the two transducers 410A, 410B parallel the user's arm and hand. Values for characteristics of each wave are selected by the wearable device 600 (or the computer system 130) so that the two waves 116a, 116b create a haptic stimulation corresponding to visual data displayed by the computer system 130 (e.g., a pull stimulation).

The pull stimulation illustrated in FIGS. 9C-9D is merely one of the many possible haptic stimulations. For example, a touch stimulation, a swipe stimulation, a push stimulation (e.g., waves are generated in the opposite direction to the direction shown in FIGS. 9C-9D), a rotation stimulation, among others, can also be created. Moreover, any number of transducers may be activated depending on the circumstance.

Figure 9E:
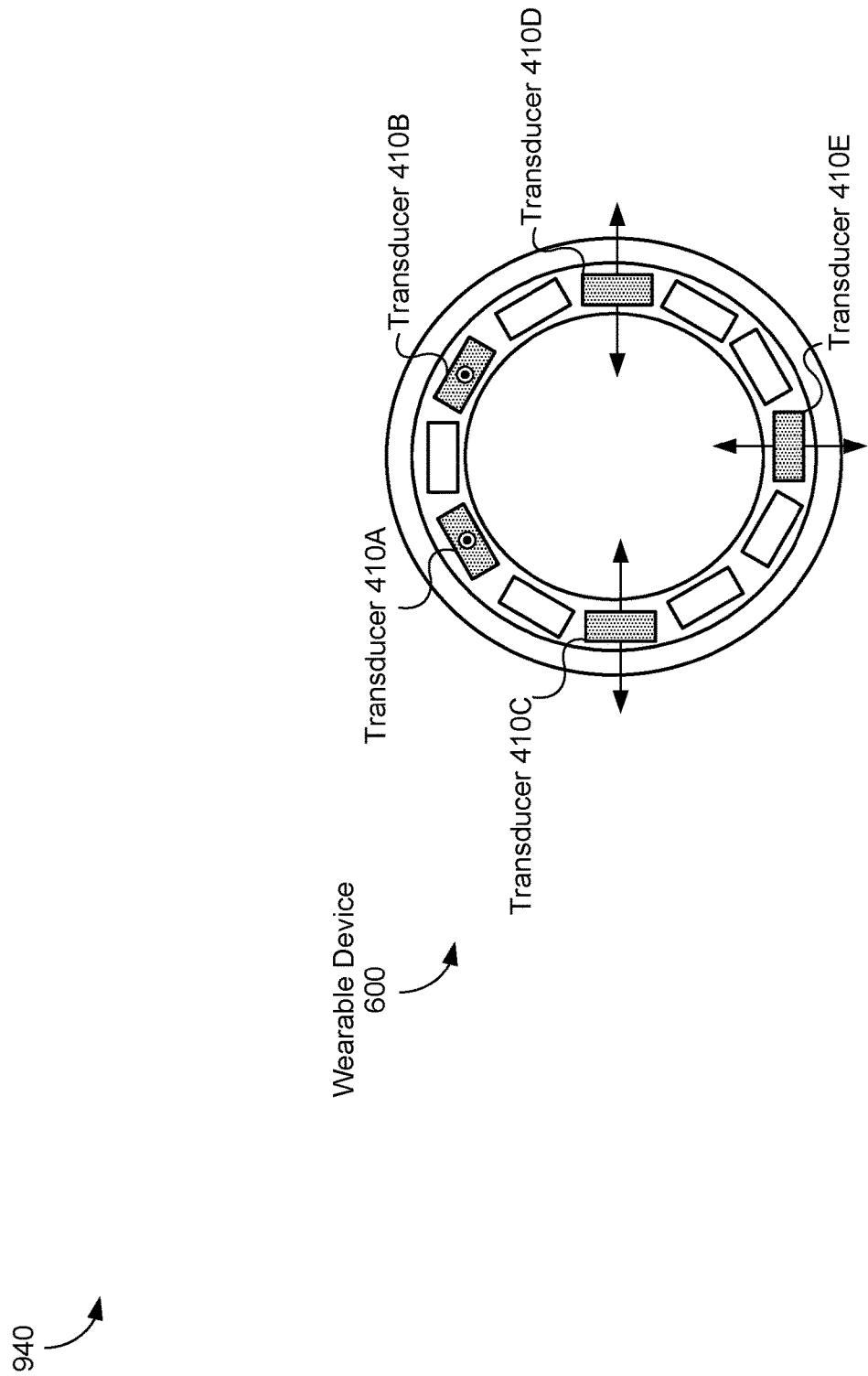

FIG. 9E is a cross-sectional view 940 of the wearable device 600 taken along "A" view (FIG. 8), in accordance with some embodiments. The user's arm has been removed from FIG. 9E for ease of illustration. As shown, five transducers 410A-410E are activated (indicated by shading), and each is generating a respective wave (or waves) indicated by arrows (note that the wave(s) for transducers 410A and 410B are coming out of the page and also potentially going into the page). Accordingly, the wearable device 600 is configured such that a first group of transducers can generate waves that travel in a first direction (e.g., into and/or out of the page), a second group of transducers can generate waves that travel in a second direction (e.g., east and/or west), and so on. It is noted that other directions not shown in FIGS. 9A-9E are also possible such as 45 degrees, or various other angles with respect to the X, Y, or Z axes. Moreover, in some embodiments, the first group of transducers generates waves at a first time, the second group of transducers generates waves a second time, and so on. In doing so, the wearable device 600 is able to create various unique stimulations (e.g., a rotation stimulation). Alternatively, in some embodiments, each transducer generates waves simultaneously.

In some embodiments, the transducers 410 are arranged in multiple row and/or columns on the wearable device and transducers in a first respective column (or row) are adjacent to and parallel with corresponding transducers in a second respective column (or row) (e.g., transducers arrangement shown in FIG. 7B). In such an arrangement, in some embodiments, adjacent transducers may generate waves that travel in the same direction (e.g., transducer 410A and transducer 410B in FIG. 7B generates waves that travel to the right, or some other direction) or in different directions (e.g., transducer 410A in FIG. 7B generates one or more waves that travel to the right and transducer 410B in FIG. 7B generates one or more waves that travel to the left, or some other direction combination). It is noted that, in some embodiments, the wearable device may have a triple arrangement of transducers, a quadruple arrangement of transducers, and so on.

FIG. 10 is a flow diagram illustrating a method 1000 of generating haptic stimulations and topographic information in accordance with some embodiments. The steps of the method 1000 may be performed by a wearable device (e.g., a wearable device 102, FIG. 1). FIG. 10 corresponds to instructions stored in a computer memory or computer readable storage medium (e.g., memory 106 of the wearable device 102). For example, the operations of method 1000 are performed, at least in part, by a communication module (e.g., communication module 218, FIG. 2), a sensor module (e.g., sensor module 220, FIG. 2), and/or a wave generating module (e.g., wave generating module 222, FIG. 2).

The method 1000 is performed at a wearable device that includes a plurality of transducers (e.g., transducers 410, FIG. 4), where each transducer can generate one or more waves (e.g., waves 116, FIG. 1) (1102). In some embodiments, the transducers are piezoelectric devices (e.g., miniature piezoelectric ultrasonic transducers), single or multi-pole voice coil motors, or the like. In some embodiments, the one or more waves are mechanical waves (e.g., ultrasonic waves, soundwaves, etc.), electromagnetic waves, and/or various other waves. In some embodiments, a medium for the waves is the user's body (skin, flesh, bone, etc.). For example, the wearable device may be attached to a wrist of the user, and the one or more waves may propagate away from the wearable device through the user's body below the wearable device. Alternatively or in addition, in some embodiments, the medium is air.

In some embodiments, the wearable device further includes a band (e.g., wearable structure 402, FIG. 4; wearable structure 602, FIG. 6A) to be secured around a wrist (or other body part) of the user, and each of the plurality of transducers is coupled to (e.g., integrated with) the band. In some embodiments, transducers of the plurality are radially spaced along a perimeter of the band (e.g., transducer arrangement shown in FIG. 6B). In some embodiments, the wearable device includes a housing that houses the components of the wearable device. Further, in some embodiments, the plurality of transducers contacts the user's skin (or is separated from the user's skin by a conductive agent 502).

The method 1000 includes activating (1004) one or more first transducers of the plurality of transducers (e.g., transducers 410A and 410B, FIG. 9A) based on an instruction. In some embodiments, the instruction is received from a remote device (e.g., computer system 130, FIG. 1). In some embodiments, activating the one or more first transducers includes activating the one or more first transducers simultaneously. Alternatively, in some embodiments, activating the one or more first transducers includes: (i) activating a first transducer (or a first group of transducers) of the one or more first transducers at a first time and (ii) activating a second transducer (or a second group of transducers) of the one or more first transducers at a second time after the first time. For example, in some circumstances (e.g., depending on a target location and a position of each transducer on the wearable device), two or more of the first transducers are activated at different times to ensure that the waves transmitted by the two or more first transducers constructively interfere with another at the target location. In some embodiments, the instruction includes a time difference between each respective activation.

In some embodiments, the method 1000 further includes selecting values for characteristics of waves to be generated by the one or more first transducers based, at least in part, on a known impedance of the medium (e.g., using known impedances information 232, FIG. 2). In some instances, the known impedance of the medium is determined based on characteristics of the user. The characteristics of the user include but are not limited to age, sex, body fat index, and area of the body. The characteristics of the waves include but are not limited to frequency, amplitude, phase, wavelength, pulse duration, and gain. Shapes of the waves include but are not limited to sine, triangle, square, asymmetric, and arbitrary.

Waves generated by the activated one or more first transducers provide a haptic stimulation to the user of the wearable device. In some embodiments, the haptic stimulation corresponds to visual data displayed by the remote device (e.g., visual data displayed by the head-mounted display 140, FIG. 1). In order to maintain a sense of realism, the haptic stimulation must coincide with the corresponding visual data. To accomplish this, the instruction from the remote device may include a time delay, and activating the one or more first transducers is then performed in accordance with the time delay. Other techniques known by those skilled in the art can also be employed to ensure that the haptic stimulation coincides with the corresponding visual data. The haptic stimulation may also correspond to information received from one or more sensors of the wearable device 102 (e.g., based on information from the optional IMU and/or information from the sensors 114, such as a heart rate sensor). Further, the haptic stimulation may also correspond to information received from one or more sensors of the head-mounted display.

The method 1000 further includes activating (1006) one or more second transducers of the plurality of transducers. In some embodiments, activating the one or more second transducers includes activating the one or more second transducers simultaneously. Alternatively, in some embodiments, activating the one or more second transducers includes: (i) activating a first transducer (or a first group of transducers) of the one or more second transducers at a first time and (ii) activating a second transducer (or a second group of transducers) of the one or more second transducers at a second time after the first time. In some embodiments, the instruction includes a time difference between each respective activation.

In some embodiments, activating the one or more second transducers is performed in response to receiving the instruction. In some embodiments, activating the one or more second transducers is performed periodically during use (e.g., every second, or some lesser or greater time period).

Waves (signals) generated by the activated one or more second transducers provide anatomical information of a user of the wearable device when the waves are received by one or more transducers of the plurality of transducers. In some embodiments, the anatomical information corresponds to a user's hand posture at a particular point in time (e.g., when the wearable device is attached to the user's wrist as shown in FIGS. 5A-5B). In some embodiments, the one or more transducers of the plurality of transducers that receive the waves are opposite the one or more second transducers (e.g., as shown in FIG. 5B). In some embodiments, the one or more transducers that receive the waves generated by the activated one or more second transducers include one or more transducers from (i) the one or more second transducers and/or (ii) the one or more first transducers. In some embodiments, the one or more transducers that receive the waves generated by the activated one or more second transducers are not part of the one or more second transducers or the one or more first transducers. Determining a hand posture of the user is discussed in further detail above with reference to FIGS. 5A-5C.

In some embodiments, activating the one or more first transducers and the one or more second transducers includes simultaneously activating the first and second transducers. Alternatively, in some embodiments, the one or more first transducers are activated at a first time and the one or more second transducers are activated a second time different from the first time (e.g., the one or more second transducers may be activated before the one or more first transducers).

In some embodiments, the waves generated by the one or more first transducers are generated at a first frequency within a first frequency range, the waves generated by the one or more second transducers are generated at a second frequency within a second frequency range different from the first frequency range. For example, the first frequency range may range from about 20 Hz to 1000 Hz and the second frequency range may range from about 10 kHz to 60 kHz. The waves generated by the one or more first transducers may have the same frequencies or different frequencies within the first frequency range.

The waves generated by the one or more second transducers may have the same frequencies or different frequencies within the second frequency range. In some instances, different frequencies are needed to acquire comprehensive anatomical information for a particular portion of the body. For example, a first frequency may be used to obtain anatomical information for tendons whereas a second frequency may be used to obtain anatomical information for muscles (or some other body part). To illustrate, the wearable device may activate a first group of transducers, where the first group of transducers generates waves at a first frequency to gather first anatomical information. Subsequently (or simultaneously), the wearable device may activate a second group of transducers, where the second group of transducers generates waves at a second frequency to gather second anatomical information. The first and second groups may be the same or may differ in some respect. In some embodiments, the first and second anatomical information may compose the anatomical information.

In some embodiments, the wearable device includes a radio (e.g., communications component 112, FIG. 1) in wireless communication with the remote device (e.g., in wireless communication with communications component 136, FIG. 1). Further, in some embodiments, the method 1000 further includes receiving, via the radio, the instruction from the remote device (e.g., via a communication signal 118, FIG. 1).

Moreover, in some embodiments, the method 1000 further includes sending, via the radio, the anatomical information to the remote device after activating the one or more second transducers. In some embodiments, the anatomical information, when received by the remote device, causes the remote device to (i) generate at least a partial representation of the user of the wearable device from the anatomical information and (ii) include the representation in the visual data displayed by the head-mounted display. For example, when the wearable device is attached to the user's wrist, the remote device generates a representation of the user's hand (i.e., the partial representation of the user) from the anatomical information, thereby obtaining a posture of the user's hand. Further, the remote device includes the representation of the user's hand in the visual data, which is then displayed by the head-mounted display (e.g., a virtual hand is displayed having the posture of the user's hand).

In some instances, the generated representation of the user's hand can be further used to identity a gesture being made by the user. For example, the representation of the user's hand may indicate that the user is making a pinch gesture with his right hand. In another example, the representation of the user's hand may indicate that the user is pressing (or attempting to press on) on a surface with one finger (or multiple fingers). In yet another example, the representation of the user's hand may indicate that the user is making a full-hand swipe gesture or a finger swipe gesture (e.g., to swipe through virtual or augmented objects, or dismiss a virtual object or menu). In yet another example, the representation of the user's hand may indicate that the user is attempting to grasp an object. Various other gestures could also be detected and used to manipulate what is displayed by the head-mounted display.

In some embodiments, the instruction is based at least in part on the anatomical information generated by the wearable device. For example, a location (or some other characteristic) of the haptic stimulation in the instruction may correspond to the partial representation of the user generated by the remote device. Moreover, the remote device may change one or more characteristics of the wave(s) generated by the one or more first transducers and/or may change the transducers that might have otherwise been activated (e.g., adjust values of the characteristics of the wave(s)). In these embodiments, the one or more second transducers are activated before the one or more first transducers.

In some embodiments, the remote device combines the anatomical information with other forms of data to generate the partial representation of the user. For example, the anatomical information may be combined with image data captured by the one or more cameras 139 of the remote device, and the remote device generates the partial representation of the user using the anatomical information and the image data. In another example (in addition to or separate from the previous example), the anatomical information may be combined with IMU data captured by an IMU of the wearable device (e.g., the wearable device sends the IMU data to the remote device 130). Moreover, at least in some embodiments, the remote device combines anatomical information, image data, and IMU data to generate the partial representation of the user. In some embodiments, the processors 132 of the remote device 130 and/or the processors 141 of the head-mounted display generate the partial representation of the user.

In some embodiments, the one or more first transducers (and/or the one or more second transducers) are separated from one another by at least one other transducer. Alternatively, in some embodiments, the one or more first transducers (and/or the one or more second transducers) are adjacent to one another on the wearable device. In some embodiments, transducers of the plurality are spaced equidistant from one another on the wearable device. In some embodiments, the one or more first transducers and the one or more second transducers are the same transducers. Further, in some embodiments, the one or more first transducers and the one or more second transducers include all the transducers in the plurality of transducers.

In some embodiments, the wearable device is a first wearable device (e.g., the first wearable device is attached to a left wrist of the user). Further, one or more additional wearable devices (e.g., 102b, 102c, etc.) may be attached to various other parts of the user (e.g., the right wrist of the user, an ankle of the user, a bicep of the user, and so on). Each additional wearable device is configured to perform the steps of method 1000. For example, the wearable device attached to a right bicep of the user can be used to determine whether the user's arm is straight or flexed by obtaining anatomical information of the right bicep. Moreover, the wearable device attached to the right bicep could also create one or more haptic stimulations along the right bicep based on an instruction from the remote device.

In some embodiments, the remote device uses mapping data 334 (FIG. 3) to track a location of each wearable device. For example, the wearable device 102 is not limited to particular appendage, and therefore, the remote device updates the mapping data 334 periodically (e.g., at start-up of the system). To accomplish the updating, the wearable device(s) being used each send location information to the remote device (e.g., using a location detection device, discussed with reference to FIG. 2), and the remote device updates the mapping data 334 based on the location information. In this way, the remote device can determine that a first wearable device is attached to the user's left arm, even though the first wearable device was attached to the right arm during a previous use. In some embodiments, each wearable device has a unique identifier that allows the remote device to differentiate between each wearable device (as described above with reference to FIG. 2). The identifier may be included in the location information or may be sent separately.

Figure 11:
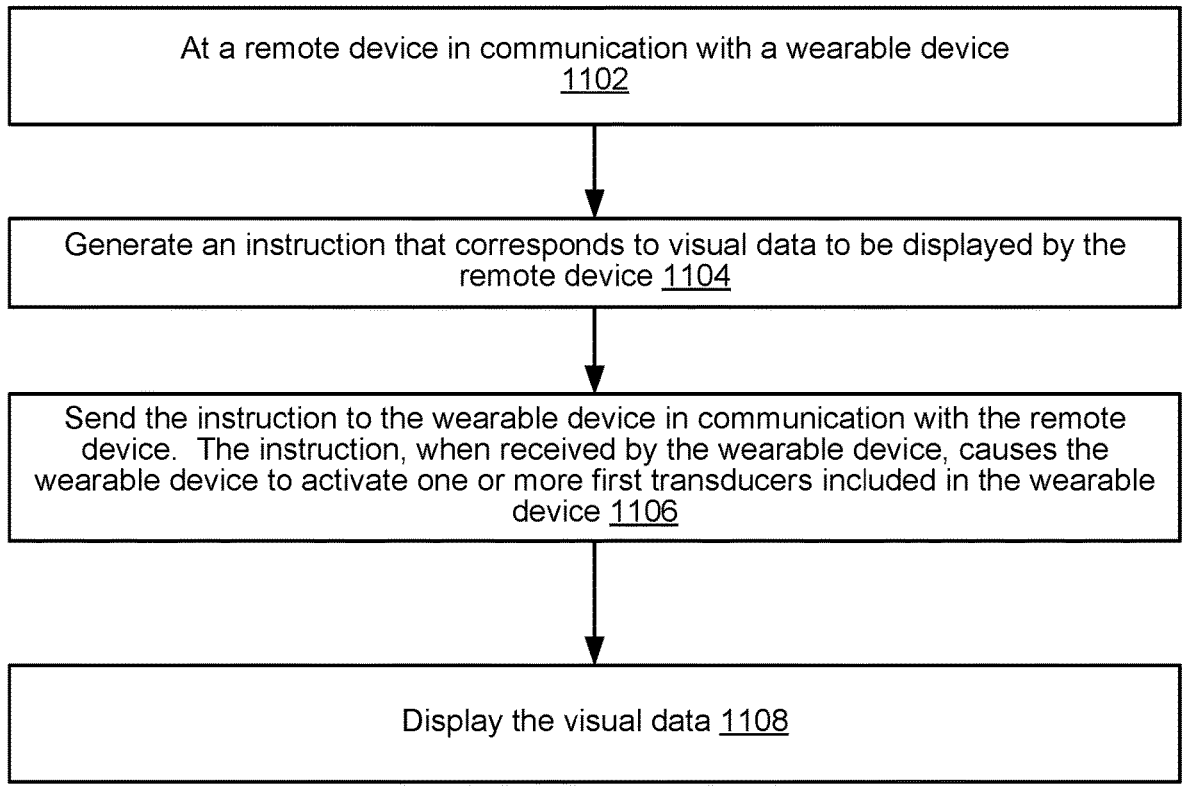
FIG. 11 is a flow diagram illustrating a method of managing creation of haptic stimulations and anatomical information in accordance with some embodiments.

FIG. 11 is a flow diagram illustrating a method 1100 of managing creation of haptic stimulations and anatomical information in accordance with some embodiments. The steps of the method 1100 may be performed by a remote device (e.g., computer system 130, FIG. 1) (1102). FIG. 11 corresponds to instructions stored in a computer memory or computer readable storage medium (e.g., memory 134 of the computer system 130). For example, the operations of method 1100 are performed, at least in part, by a communication module (e.g., communication module 318, FIG. 3), a virtual-reality/augment reality generation module (e.g., virtual-reality generation module 320, FIG. 3), an instruction generation module (e.g., instruction generation module 322, FIG. 3), and/or a display module (e.g., display module 324, FIG. 3). It is noted that the steps of the method 1100 can be performed in conjunction with the steps the method 1000. In some embodiments, the host system corresponds to the AR system 1400 and/or the VR system 1500.

The method 1100 includes generating (1104) an instruction that corresponds to visual data to be displayed by the remote device (and/or corresponds to information received from one or more sensors of the wearable device 102). In some embodiments, the remote device generates the instruction based on information received from the sensors 114 on the wearable device 102. Additionally, the information received by the remote device can also include information from the head-mounted display 140. For example, cameras on the head-mounted display 140 may capture movements of the wearable device 102, and the remote device can use this additional information when generating the instruction.

The method 1100 further includes sending (1106) the instruction to the wearable device in communication with the remote device (e.g., send the instruction in a communication signal 118 from the communications component 136, FIG. 1). The instruction, when received by the wearable device, causes the wearable device to activate one or more first transducers included in the wearable device (as explained above at step 1004 (FIG. 10). Further, in some embodiments, the instruction, when received by the wearable device, causes the wearable device to activate one or more second transducers included in the wearable device (e.g., step 1006, FIG. 10). As discussed above with reference to step 1006, waves generated by the activated one or more second transducers provide anatomical information of a user of the wearable device when the waves are received by one or more transducers of the plurality of transducers.

After (or while) sending the instruction, the method 1100 further includes displaying (1108) the visual data. For example, the head-mounted display 140 may receive the visual data from the remote device, and may in turn display the visual data on the display 144. As an example, if the remote device receives information from the sensors 114 of the wearable device 102 that the user has closed his fingers around a position corresponding to a coffee mug in the virtual environment and raised his hand, a simulated hand in a virtual-reality application (e.g., VR application 336, FIG. 3) picks up the virtual coffee mug and lifts it to a corresponding height.

In conjunction with displaying the visual data, the wearable device activates one or more first transducers of the plurality of transducers based on the instruction received from the remote device. Waves generated by the activated one or more first transducers provide a haptic stimulation on a user of the wearable device, where the haptic stimulation created on the user corresponds to the visual data displayed by the remote device (described in more detail above with reference to the method 1000). For example, using the coffee cup example from above, the haptic stimulation may prevent one or more of the user's finger from curling past a certain point to simulate the sensation of touching a solid coffee mug.

In some embodiments, the method 1100 further includes receiving (e.g., via communications component 136, FIG. 1) anatomical information from the wearable device. For example, the anatomical information corresponds to a user's hand posture at a particular point in time. In response to receiving the anatomical information, the method 1100 further includes generating at least a partial representation of the user of the wearable device from the anatomical information (described in more detail above with reference to the method 1000).

To further illustrate, additional examples are provided below.

The remote device may communicate visual data with a head-mounted display 140 (FIG. 1), where the visual data, when displayed by the head-mounted display, depicts the wearer's character in a virtual-reality (or augmented-reality) video game holding a bow and arrow. Prior to displaying release of the arrow, the remote device also communicates an instruction to a wearable device, where the instruction, when performed by the wearable device, causes the wearable device to activate one or more transducers that, when activated, create a haptic stimulation on the user that mimics the arrow being released from the bow displayed by the head-mounted display 140.

In addition (still with reference to the bow and arrow example), the wearable device may generate anatomical information that corresponds to the user's hand holding the frame of the bow (another wearable device could also generate anatomical information that corresponds to the user's other hand holding the string of the bow). The wearable device may in turn send the anatomical information to the remote device (in some embodiments, the anatomical information is sent to the remote device before the head-mounted display displays the user's hand(s)). The anatomical information, when received by the remote device, causes the remote device to generate (or modify) a representation of the user's hand holding the frame of the bow (e.g., the remote device processes the anatomical information and generates the representation based on the anatomical information). Thereafter, the remote device can incorporate the representation into the visual data to be displayed by the head-mounted display. In doing so, the hand displayed by the head-mounted display mimics the actual pose of the user's hand.

Moreover (still with reference to the bow and arrow example), in some embodiments, the instruction is based at least in part on the generated representation (i.e., the anatomical information), as described above with reference to the method 1000. To illustrate using the bow and arrow example, assume prior to receiving and processing the anatomical information, the instruction would have instructed the wearable device to create a haptic stimulation along the user's index finger. However, after receiving and processing the anatomical information, the remote device modifies the instruction, where the modified instruction instructs the wearable device to create a haptic stimulation along the user's middle finger (or some other body part).

It is noted that multiple haptic stimulations can be created to follow along with the video data displayed by the head-mounted display 140. For example, a first haptic stimulation may be created at a first time, a second haptic stimulation may be created at a second time, and so on. Moreover, if multiple wearable devices are in communication with the remote device, then multiple haptic stimulations can be created at different locations on the user's body. For example, a first haptic stimulation may be created at a first limb by a first wearable device, a second haptic stimulation may be created at a second limb by a second wearable device, and so on.

Additionally, multiple versions of anatomical information can be created to continually update the visual data displayed by the head-mounted display 140. For example, first anatomical information may be created at a first time, second anatomical information may be created at a second time, and so on. Moreover, if multiple wearable devices are in communication with the remote device, then different anatomical information can be created at different locations on the user's body. It is further noted that in some instances the anatomical information may be gathered prior to visual data being displayed by the head-mounted display. For example, the wearable device may continuously gather anatomical information that corresponds to the user's hand pose (or some other body part depending on a location of the wearable device). In this way, the remote device may also continuously update the visual data to account for changes in the user's hand pose.

Embodiments of the instant disclosure may include or be implemented in conjunction with various types of artificial reality systems. Artificial reality may constitute a form of reality that has been altered by virtual objects for presentation to a user. Such artificial reality may include and/or represent VR, AR, MR, hybrid reality, or some combination and/or variation of one or more of the same. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to a viewer). Additionally, in some embodiments, artificial reality may also be associated with applications, products, accessories, services, or some combination thereof, that are used to, e.g., create content in an artificial reality and/or are otherwise used in (e.g., to perform activities in) an artificial reality.

Artificial reality systems may be implemented in a variety of different form factors and configurations. Some artificial reality systems may be designed to work without near-eye displays (NEDs), an example of which is AR system 1300 in FIG. 13. Other artificial reality systems may include an NED that also provides visibility into the real world (e.g., AR system 1400 in FIG. 14) or that visually immerses a user in an artificial reality (e.g., VR system 1500 in FIG. 15). While some artificial reality devices may be self-contained systems, other artificial reality devices may communicate and/or coordinate with external devices to provide an artificial reality experience to a user. Examples of such external devices include handheld controllers, mobile devices, desktop computers, devices worn by a user (e.g., wearable device 102a, wearable device 102b, . . . wearable device 102n), devices worn by one or more other users, and/or any other suitable external system.

Figure 13:
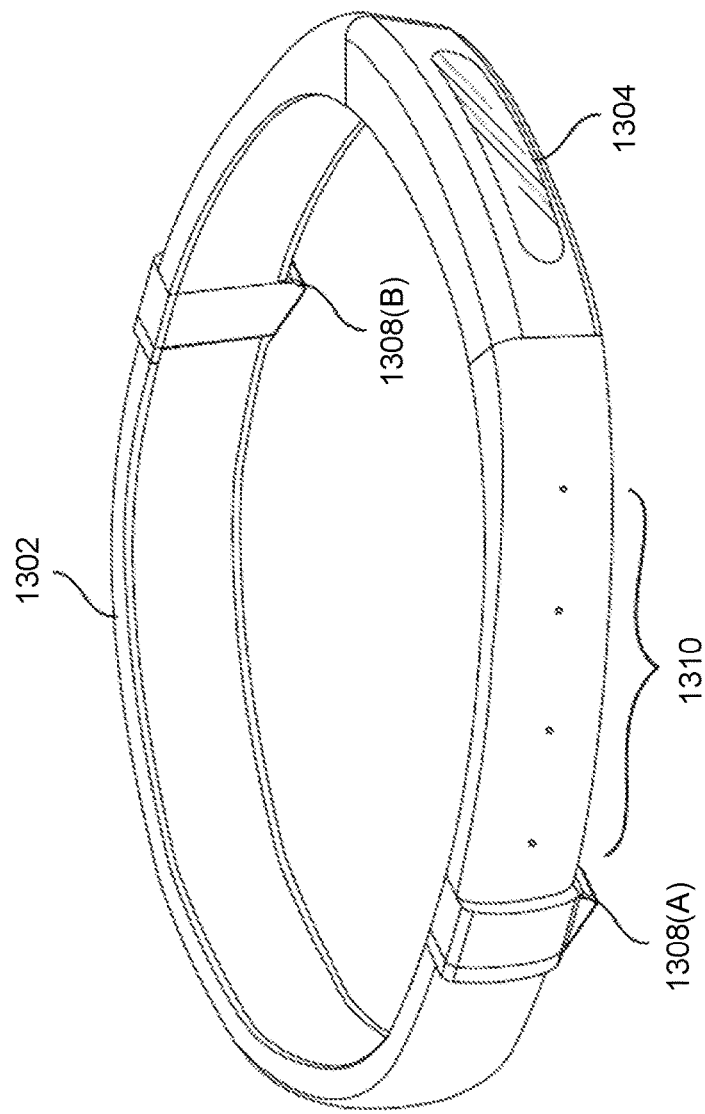
FIG. 13 illustrates an embodiment of an artificial reality device.

FIGS. 13-15 provide additional examples of the devices used in the system 100. AR system 1300 in FIG. 13 generally represents a wearable device dimensioned to fit about a body part (e.g., a head) of a user. The AR system 1300 may include the functionality of the wearable device 102, and may include additional functions. As shown, the AR system 1300 includes a frame 1302 (e.g., band) and a camera assembly 1304 that is coupled to frame 1302 and configured to gather information about a local environment by observing the local environment. The AR system 1300 may also include one or more transducers (e.g., instances of the transducers 410, FIG. 4). In one example, the AR system 1300 includes output transducers 1308(A) and 1308(B) and input transducers 1310. Output transducers 1308(A) and 1308(B) may provide audio feedback, haptic feedback, and/or content to a user, and input audio transducers may capture audio (or other signals/waves) in a user's environment. As such, the transducers of the AR system 1300 may be configured to generate waves for creating haptic stimulations, as discussed in detail above.

Thus, the AR system 1300 does not include a near-eye display (NED) positioned in front of a user's eyes. AR systems without NEDs may take a variety of forms, such as head bands, hats, hair bands, belts, watches, wrist bands, ankle bands, rings, neckbands, necklaces, chest bands, eyewear frames, and/or any other suitable type or form of apparatus. While the AR system 1300 may not include an NED, the AR system 1300 may include other types of screens or visual feedback devices (e.g., a display screen integrated into a side of frame 1302).

The embodiments discussed in this disclosure may also be implemented in AR systems that include one or more NEDs. For example, as shown in FIG. 14, the AR system 1400 may include an eyewear device 1402 with a frame 1410 configured to hold a left display device 1415(A) and a right display device 1415(B) in front of a user's eyes. Display devices 1415(A) and 1415(B) may act together or independently to present an image or series of images to a user. While the AR system 1400 includes two displays, embodiments of this disclosure may be implemented in AR systems with a single NED or more than two NEDs.

In some embodiments, the AR system 1400 may include one or more sensors, such as sensor 1440. Sensor 1440 may generate measurement signals in response to motion of AR system 1400 and may be located on substantially any portion of frame 1410. Sensor 1440 may include a position sensor, an inertial measurement unit (IMU), a depth camera assembly, or any combination thereof. In some embodiments, the AR system 1400 may or may not include sensor 1440 or may include more than one sensor. In embodiments in which sensor 1440 includes an IMU, the IMU may generate calibration data based on measurement signals from sensor 1440. Examples of sensor 1440 may include, without limitation, accelerometers, gyroscopes, magnetometers, other suitable types of sensors that detect motion, sensors used for error correction of the IMU, or some combination thereof. Sensors are also discussed above with reference to FIG. 1 (e.g., sensors 145 of the head-mounted display 140).

The AR system 1400 may also include a microphone array with a plurality of acoustic sensors 1420(A)-1420(J), referred to collectively as acoustic sensors 1420. Acoustic sensors 1420 may be transducers that detect air pressure variations induced by sound waves. Each acoustic sensor 1420 may be configured to detect sound and convert the detected sound into an electronic format (e.g., an analog or digital format). The microphone array in FIG. 14 may include, for example, ten acoustic sensors: 1420(A) and 1420(B), which may be designed to be placed inside a corresponding ear of the user, acoustic sensors 1420(C), 1420(D), 1420(E), 1420(F), 1420(G), and 1420(H), which may be positioned at various locations on frame 1410, and/or acoustic sensors 1420(I) and 1420(J), which may be positioned on a corresponding neckband 1405. In some embodiments, the neckband 1405 is an example of the computer system 130.

The configuration of acoustic sensors 1420 of the microphone array may vary. While the AR system 1400 is shown in FIG. 14 as having ten acoustic sensors 1420, the number of acoustic sensors 1420 may be greater or less than ten. In some embodiments, using higher numbers of acoustic sensors 1420 may increase the amount of audio information collected and/or the sensitivity and accuracy of the audio information. In contrast, using a lower number of acoustic sensors 1420 may decrease the computing power required by a controller 1450 to process the collected audio information. In addition, the position of each acoustic sensor 1420 of the microphone array may vary. For example, the position of an acoustic sensor 1420 may include a defined position on the user, a defined coordinate on the frame 1410, an orientation associated with each acoustic sensor, or some combination thereof.

Acoustic sensors 1420(A) and 1420(B) may be positioned on different parts of the user's ear, such as behind the pinna or within the auricle or fossa. Or, there may be additional acoustic sensors on or surrounding the ear in addition to acoustic sensors 1420 inside the ear canal. Having an acoustic sensor positioned next to an ear canal of a user may enable the microphone array to collect information on how sounds arrive at the ear canal. By positioning at least two of acoustic sensors 1420 on either side of a user's head (e.g., as binaural microphones), the AR device 1400 may simulate binaural hearing and capture a 3D stereo sound field around about a user's head. In some embodiments, the acoustic sensors 1420(A) and 1420(B) may be connected to the AR system 1400 via a wired connection, and in other embodiments, the acoustic sensors 1420(A) and 1420(B) may be connected to the AR system 1400 via a wireless connection (e.g., a Bluetooth connection). In still other embodiments, acoustic sensors 1420(A) and 1420(B) may not be used at all in conjunction with the AR system 1400.

Acoustic sensors 1420 on frame 1410 may be positioned along the length of the temples, across the bridge, above or below display devices 1415(A) and 1415(B), or some combination thereof. Acoustic sensors 1420 may be oriented such that the microphone array is able to detect sounds in a wide range of directions surrounding the user wearing AR system 1400. In some embodiments, an optimization process may be performed during manufacturing of AR system 1400 to determine relative positioning of each acoustic sensor 1420 in the microphone array.

The AR system 1400 may further include or be connected to an external device (e.g., a paired device), such as neckband 1405. As shown, neckband 1405 may be coupled to eyewear device 1402 via one or more connectors 1430. Connectors 1430 may be wired or wireless connectors and may include electrical and/or non-electrical (e.g., structural) components. In some cases, eyewear device 1402 and neckband 1405 may operate independently without any wired or wireless connection between them. While FIG. 14 illustrates the components of eyewear device 1402 and neckband 1405 in example locations on eyewear device 1402 and neckband 1405, the components may be located elsewhere and/or distributed differently on eyewear device 1402 and/or neckband 1405. In some embodiments, the components of eyewear device 1402 and neckband 1405 may be located on one or more additional peripheral devices paired with eyewear device 1402, neckband 1405, or some combination thereof. Furthermore, neckband 1405 generally represents any type or form of paired device. Thus, the following discussion of neckband 1405 may also apply to various other paired devices, such as smart watches, smart phones, wrist bands, other wearable devices, hand-held controllers, tablet computers, laptop computers, etc.

Pairing external devices, such as neckband 1405, with AR eyewear devices may enable the eyewear devices to achieve the form factor of a pair of glasses while still providing sufficient battery and computation power for expanded capabilities. Some or all of the battery power, computational resources, and/or additional features of the AR system 1400 may be provided by a paired device or shared between a paired device and an eyewear device, thus reducing the weight, heat profile, and form factor of the eyewear device overall while still retaining desired functionality. For example, neckband 1405 may allow components that would otherwise be included on an eyewear device to be included in neckband 1405 since users may tolerate a heavier weight load on their shoulders than they would tolerate on their heads. Neckband 1405 may also have a larger surface area over which to diffuse and disperse heat to the ambient environment. Thus, neckband 1405 may allow for greater battery and computation capacity than might otherwise have been possible on a stand-alone eyewear device. Since weight carried in neckband 1405 may be less invasive to a user than weight carried in eyewear device 1402, a user may tolerate wearing a lighter eyewear device and carrying or wearing the paired device for greater lengths of time than the user would tolerate wearing a heavy standalone eyewear device, thereby enabling an artificial reality environment to be incorporated more fully into a user's day-to-day activities.

Neckband 1405 may be communicatively coupled with eyewear device 1402 and/or to other devices. The other devices may provide certain functions (e.g., tracking, localizing, depth mapping, processing, storage, etc.) to the AR system 1400. In the embodiment of FIG. 14, neckband 1405 may include two acoustic sensors (e.g., 1420(I) and 1420(J)) that are part of the microphone array (or potentially form their own microphone subarray). Neckband 1405 may also include a controller 1425 and a power source 1435.

Acoustic sensors 1420(I) and 1420(J) of neckband 1405 may be configured to detect sound and convert the detected sound into an electronic format (analog or digital). In the embodiment of FIG. 14, acoustic sensors 1420(I) and 1420 (J) may be positioned on neckband 1405, thereby increasing the distance between neckband acoustic sensors 1420(I) and 1420(J) and other acoustic sensors 1420 positioned on eyewear device 1402. In some cases, increasing the distance between acoustic sensors 1420 of the microphone array may improve the accuracy of beamforming performed via the microphone array. For example, if a sound is detected by acoustic sensors 1420(C) and 1420(D) and the distance between acoustic sensors 1420(C) and 1420(D) is greater than, e.g., the distance between acoustic sensors 1420(D) and 1420(E), the determined source location of the detected sound may be more accurate than if the sound had been detected by acoustic sensors 1420(D) and 1420(E).

Controller 1425 of neckband 1405 may process information generated by the sensors on neckband 1405 and/or AR system 1400. For example, controller 1425 may process information from the microphone array that describes sounds detected by the microphone array. For each detected sound, controller 1425 may perform a direction of arrival (DOA) estimation to estimate a direction from which the detected sound arrived at the microphone array. As the microphone array detects sounds, controller 1425 may populate an audio data set with the information. In embodiments in which AR system 1400 includes an IMU, controller 1425 may compute all inertial and spatial calculations from the IMU located on eyewear device 1402. Connector 1430 may convey information between AR system 1400 and neckband 1405 and between AR system 1400 and controller 1425. The information may be in the form of optical data, electrical data, wireless data, or any other transmittable data form. Moving the processing of information generated by AR system 1400 to neckband 1405 may reduce weight and heat in eyewear device 1402, making it more comfortable to a user.

Power source 1435 in neckband 1405 may provide power to eyewear device 1402 and/or to neckband 1405. Power source 1435 may include, without limitation, lithium-ion batteries, lithium-polymer batteries, primary lithium batteries, alkaline batteries, or any other form of power storage. In some cases, power source 1435 may be a wired power source. Including power source 1435 on neckband 1405 instead of on eyewear device 1402 may help better distribute the weight and heat generated by power source 1435.

As noted, some artificial reality systems may, instead of blending an artificial reality with actual reality, substantially replace one or more of a user's sensory perceptions of the real world with a virtual experience. One example of this type of system is a head-worn display system, such as VR system 1500 in FIG. 15, that mostly or completely covers a user's field of view. VR system 1500 may include a front rigid body 1502 and a band 1504 shaped to fit around a user's head. VR system 1500 may also include output audio transducers 1506(A) and 1506(B). Furthermore, while not shown in FIG. 15, front rigid body 1502 may include one or more electronic elements, including one or more electronic displays, one or more IMUs, one or more tracking emitters or detectors, and/or any other suitable device or system for creating an artificial reality experience. Although not shown, the VR system 1500 may include the computer system 130.

Artificial reality systems may include a variety of types of visual feedback mechanisms. For example, display devices in AR system 1400 and/or VR system 1500 may include one or more liquid-crystal displays (LCDs), light emitting diode (LED) displays, organic LED (OLED) displays, and/or any other suitable type of display screen. Artificial reality systems may include a single display screen for both eyes or may provide a display screen for each eye, which may allow for additional flexibility for varifocal adjustments or for correcting a user's refractive error. Some artificial reality systems may also include optical subsystems having one or more lenses (e.g., conventional concave or convex lenses, Fresnel lenses, adjustable liquid lenses, etc.) through which a user may view a display screen.

In addition to or instead of using display screens, some artificial reality systems may include one or more projection systems. For example, display devices in AR system 1400 and/or VR system 1500 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial reality content and the real world. Artificial reality systems may also be configured with any other suitable type or form of image projection system.

Artificial reality systems may also include various types of computer vision components and subsystems. For example, AR system 1300, AR system 1400, and/or VR system 1500 may include one or more optical sensors such as two-dimensional (2D) or three-dimensional (3D) cameras, time-of-flight depth sensors, single-beam or sweeping laser rangefinders, 3D LiDAR sensors, and/or any other suitable type or form of optical sensor. An artificial reality system may process data from one or more of these sensors to identify a location of a user, to map the real world, to provide a user with context about real-world surroundings, and/or to perform a variety of other functions.

Artificial reality systems may also include one or more input and/or output audio transducers. In the examples shown in FIGS. 13 and 15, output audio transducers 1308(A), 1308(B), 1306(A), and 1506(B) may include voice coil speakers, ribbon speakers, electrostatic speakers, piezoelectric speakers, bone conduction transducers, cartilage conduction transducers, and/or any other suitable type or form of audio transducer. Similarly, input audio transducers 1310 may include condenser microphones, dynamic microphones, ribbon microphones, and/or any other type or form of input transducer. In some embodiments, a single transducer may be used for both audio input and audio output.

The artificial reality systems shown in FIGS. 13-15 may include tactile (i.e., haptic) feedback systems, which may be incorporated into headwear, gloves, body suits, handheld controllers, environmental devices (e.g., chairs, floormats, etc.), and/or any other type of device or system, such as the wearable devices 102 discussed herein. Additionally, in some embodiments, the haptic feedback systems may be incorporated with the artificial reality systems (e.g., the AR system 1300 may include the wearable device 102 (FIG. 1). Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial reality devices, within other artificial reality devices, and/or in conjunction with other artificial reality devices.

By providing haptic sensations, audible content, and/or visual content, artificial reality systems may create an entire virtual experience or enhance a user's real-world experience in a variety of contexts and environments. For instance, artificial reality systems may assist or extend a user's perception, memory, or cognition within a particular environment. Some systems may enhance a user's interactions with other people in the real world or may enable more immersive interactions with other people in a virtual world. Artificial reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, vision aids, etc.). The embodiments disclosed herein may enable or enhance a user's artificial reality experience in one or more of these contexts and environments and/or in other contexts and environments.

Some AR systems may map a user's environment using techniques referred to as "simultaneous location and mapping" (SLAM). SLAM mapping and location identifying techniques may involve a variety of hardware and software tools that can create or update a map of an environment while simultaneously keeping track of a device's or a user's location and/or orientation within the mapped environment. SLAM may use many different types of sensors to create a map and determine a device's or a user's position within the map.

SLAM techniques may, for example, implement optical sensors to determine a device's or a user's location, position, or orientation. Radios including WiFi, Bluetooth, global positioning system (GPS), cellular or other communication devices may also be used to determine a user's location relative to a radio transceiver or group of transceivers (e.g., a WiFi router or group of GPS satellites). Acoustic sensors such as microphone arrays or 2D or 3D sonar sensors may also be used to determine a user's location within an environment. AR and VR devices (such as systems 1300, 1400, and 1500) may incorporate any or all of these types of sensors to perform SLAM operations such as creating and continually updating maps of a device's or a user's current environment. In at least some of the embodiments described herein, SLAM data generated by these sensors may be referred to as "environmental data" and may indicate a device's or a user's current environment. This data may be stored in a local or remote data store (e.g., a cloud data store) and may be provided to a user's AR/VR device on demand.

When the user is wearing an AR headset or VR headset in a given environment, the user may be interacting with other users or other electronic devices that serve as audio sources. In some cases, it may be desirable to determine where the audio sources are located relative to the user and then present the audio sources to the user as if they were coming from the location of the audio source. The process of determining where the audio sources are located relative to the user may be referred to herein as "localization," and the process of rendering playback of the audio source signal to appear as if it is coming from a specific direction may be referred to herein as "spatialization."

Localizing an audio source may be performed in a variety of different ways. In some cases, an AR or VR headset may initiate a DOA analysis to determine the location of a sound source. The DOA analysis may include analyzing the intensity, spectra, and/or arrival time of each sound at the AR/VR device to determine the direction from which the sound originated. In some cases, the DOA analysis may include any suitable algorithm for analyzing the surrounding acoustic environment in which the artificial reality device is located.

For example, the DOA analysis may be designed to receive input signals from a microphone and apply digital signal processing algorithms to the input signals to estimate the direction of arrival. These algorithms may include, for example, delay and sum algorithms where the input signal is sampled, and the resulting weighted and delayed versions of the sampled signal are averaged together to determine a direction of arrival. A least mean squared (LMS) algorithm may also be implemented to create an adaptive filter. This adaptive filter may then be used to identify differences in signal intensity, for example, or differences in time of arrival. These differences may then be used to estimate the direction of arrival. In another embodiment, the DOA may be determined by converting the input signals into the frequency domain and selecting specific bins within the time-frequency (TF) domain to process. Each selected TF bin may be processed to determine whether that bin includes a portion of the audio spectrum with a direct-path audio signal. Those bins having a portion of the direct-path signal may then be analyzed to identify the angle at which a microphone array received the direct-path audio signal. The determined angle may then be used to identify the direction of arrival for the received input signal. Other algorithms not listed above may also be used alone or in combination with the above algorithms to determine DOA.

In some embodiments, different users may perceive the source of a sound as coming from slightly different locations. This may be the result of each user having a unique head-related transfer function (HRTF), which may be dictated by a user's anatomy including ear canal length and the positioning of the ear drum. The artificial reality device may provide an alignment and orientation guide, which the user may follow to customize the sound signal presented to the user based on their unique HRTF. In some embodiments, an AR or VR device may implement one or more microphones to listen to sounds within the user's environment. The AR or VR device may use a variety of different array transfer functions (ATFs) (e.g., any of the DOA algorithms identified above) to estimate the direction of arrival for the sounds. Once the direction of arrival has been determined, the artificial reality device may play back sounds to the user according to the user's unique HRTF. Accordingly, the DOA estimation generated using an ATF may be used to determine the direction from which the sounds are to be played from. The playback sounds may be further refined based on how that specific user hears sounds according to the HRTF.

In addition to or as an alternative to performing a DOA estimation, an artificial reality device may perform localization based on information received from other types of sensors. These sensors may include cameras, infrared radiation (IR) sensors, heat sensors, motion sensors, global positioning system (GPS) receivers, or in some cases, sensor that detect a user's eye movements. For example, an artificial reality device may include an eye tracker or gaze detector that determines where a user is looking. Often, a user's eyes will look at the source of a sound, if only briefly. Such clues provided by the user's eyes may further aid in determining the location of a sound source. Other sensors such as cameras, heat sensors, and IR sensors may also indicate the location of a user, the location of an electronic device, or the location of another sound source. Any or all of the above methods may be used individually or in combination to determine the location of a sound source and may further be used to update the location of a sound source over time.

Some embodiments may implement the determined DOA to generate a more customized output audio signal for the user. For instance, an acoustic transfer function may characterize or define how a sound is received from a given location. More specifically, an acoustic transfer function may define the relationship between parameters of a sound at its source location and the parameters by which the sound signal is detected (e.g., detected by a microphone array or detected by a user's ear). An artificial reality device may include one or more acoustic sensors that detect sounds within range of the device. A controller of the artificial reality device may estimate a DOA for the detected sounds (using, e.g., any of the methods identified above) and, based on the parameters of the detected sounds, may generate an acoustic transfer function that is specific to the location of the device. This customized acoustic transfer function may thus be used to generate a spatialized output audio signal where the sound is perceived as coming from a specific location.

Indeed, once the location of the sound source or sources is known, the artificial reality device may re-render (i.e., spatialize) the sound signals to sound as if coming from the direction of that sound source. The artificial reality device may apply filters or other digital signal processing that alter the intensity, spectra, or arrival time of the sound signal. The digital signal processing may be applied in such a way that the sound signal is perceived as originating from the determined location. The artificial reality device may amplify or subdue certain frequencies or change the time that the signal arrives at each ear. In some cases, the artificial reality device may create an acoustic transfer function that is specific to the location of the device and the detected direction of arrival of the sound signal. In some embodiments, the artificial reality device may re-render the source signal in a stereo device or multi-speaker device (e.g., a surround sound device). In such cases, separate and distinct audio signals may be sent to each speaker. Each of these audio signals may be altered according to a user's HRTF and according to measurements of the user's location and the location of the sound source to sound as if they are coming from the determined location of the sound source. Accordingly, in this manner, the artificial reality device (or speakers associated with the device) may re-render an audio signal to sound as if originating from a specific location.

Although some of various drawings illustrate a number of logical stages in a particular order, stages which are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

It is noted that the embodiments disclosed herein can also be combined with any of the embodiments described in U.S.

Provisional Application No. 62/647,559, filed Mar. 23, 2018, entitled "Methods, Devices, and Systems for Determining Contact On a User of a Virtual Reality and/or Augmented Reality Device;" U.S. Provisional Application No. 62/647,560, filed Mar. 23, 2018, entitled "Methods, Devices, and Systems for Projecting an Image Onto a User and Detecting Touch Gestures"; and U.S. Provisional Application No. 62/614,790, filed Jan. 8, 2018, entitled "Methods, Devices, and Systems for Creating Localized Haptic Sensations on a User."

It also is noted that the embodiments disclosed herein can also be combined with any of the embodiments described in U.S. Utility patent application Ser. No. 16/241,890, entitled "Methods, Devices, and Systems for Determining Contact On a User of a Virtual Reality and/or Augmented Reality Device," filed Jan. 7, 2019, U.S. Utility patent application Ser. No. 16/241,893, entitled "Methods, Devices, and Systems for Displaying a User Interface on a User and Detecting Touch Gestures," filed Jan. 7, 2019, and U.S. Utility patent application Ser. No. 16/241,900, entitled "Methods, Devices, and Systems for Creating Localized Haptic Sensations on a User," filed Jan. 7, 2019.

What is claimed is:

1. A wearable device, comprising:
a plurality of transducers that can each generate one or more waves; and
one or more processors coupled with the plurality of transducers, the one or more processors being configured to:
activate one or more first transducers of the plurality of transducers based on a first instruction received from a remote device, wherein waves generated by the activated one or more first transducers provide a haptic stimulation to a user of the wearable device at a first target location;
activate one or more second transducers of the plurality of transducers, wherein waves generated by the activated one or more second transducers provide anatomical information of the user of the wearable device when the waves are received by one or more transducers of the plurality of transducers; and
in accordance with the anatomical information and a second instruction received from the remote device:
activate one or more third transducers of the plurality of transducers to provide a haptic stimulation to the user of the wearable device at a second target location distinct from the first target location.

2. The wearable device of claim 1, wherein the instruction received from the remote device corresponds to visual data displayed by a head-mounted display in communication with the remote device.

3. The wearable device of claim 1, further comprising a radio configured to receive the instruction from the remote device.

4. The wearable device of claim 1, further comprising a radio configured to send the anatomical information to the remote device after activating the one or more second transducers.

5. The wearable device of claim 4, wherein the anatomical information, when received by the remote device, causes the remote device to:
generate at least a partial representation of the user of the wearable device from the anatomical information; and
include the representation in visual data displayed by a head-mounted display in communication with the remote device.

6. The wearable device of claim 1, wherein the anatomical information corresponds to a posture of the user's hand at a particular point in time.

7. The wearable device of claim 1, wherein:
the waves generated by the one or more first transducers are generated at a first frequency within a first frequency range;
the waves generated by the one or more second transducers are generated at a second frequency within a second frequency range; and
the second frequency range is different from the first frequency range.

8. The wearable device of claim 1, further comprising a band configured to be secured around a wrist or ankle of the user,
wherein each of the plurality of transducers is coupled to the band.

9. The wearable device of claim 8, wherein transducers of the plurality of transducers are radially spaced along a perimeter of the band.

10. The wearable device of claim 9, wherein the one or more transducers of the plurality of transducers that receive the waves are opposite the one or more second transducers on the band.

11. The wearable device of claim 1, wherein transducers of the plurality of transducers are spaced equidistant from one another on the wearable device.

12. The wearable device of claim 1, wherein:
transducers in the plurality of transducers are arranged in columns on the wearable device; and
transducers in a first respective column are adjacent to and parallel with corresponding transducers in a second respective column.

13. The wearable device of claim 1, wherein the waves generated by the plurality of transducers are ultrasonic waves.

14. The wearable device of claim 1, wherein the one or more processors are further configured to activate the one or more first transducers and the one or more second transducers simultaneously.

15. The wearable device of claim 1, wherein the one or more processors are further configured to:
activate the one or more first transducers at a first time; and
activate the one or more second transducers at a second time different from the first time.

16. The wearable device of claim 1, wherein the one or more transducers that receive the waves generated by the activated one or more second transducers include one or more transducers from (i) the one or more second transducers and/or (ii) the one or more first transducers.

17. The wearable device of claim 1, wherein the one or more first transducers include:
a first group of transducers that generates waves in a first direction; and
a second group of transducers that generates waves in a second direction different from the first direction.

18. The wearable device of claim 1, wherein the anatomical information is tomographic information.

19. A method, comprising:
at a wearable device comprising a plurality of transducers that can each generate one or more waves:
activating one or more first transducers of the plurality of transducers based on a first instruction received from a remote device, wherein waves generated by the activated one or more first transducers provide a haptic stimulation to a user of the wearable device at a first target location;

activating one or more second transducers of the plurality of transducers, wherein waves generated by the activated one or more second transducers provide anatomical information of the user of the wearable device when the waves are received by one or more transducers of the plurality of transducers; and in accordance with the anatomical information and a second instruction received from the remote device:
activate one or more third transducers of the plurality of transducers to provide a haptic stimulation to the user of the wearable device at a second target location distinct from the first target location.

20. A non-transitory computer-readable storage medium, storing one or more programs configured for execution by one or more processors of a wearable device having a plurality of transducers, the one or more programs including instructions, which when executed by the one or more processors cause the wearable device to:

activate one or more first transducers of the plurality of transducers based on a first instruction received from a remote device, wherein waves generated by the activated one or more first transducers provide a haptic stimulation to a user of the wearable device at a first target location;

activate one or more second transducers of the plurality of transducers, wherein waves generated by the activated one or more second transducers provide anatomical information of the user of the wearable device when the waves are received by one or more transducers of the plurality of transducers; and in accordance with the anatomical information and a second instruction received from the remote device:
activate one or more third transducers of the plurality of transducers to provide a haptic stimulation to the user of the wearable device at a second target location distinct from the first target location.

* * * * *